INVENTOR
REINK de BOER

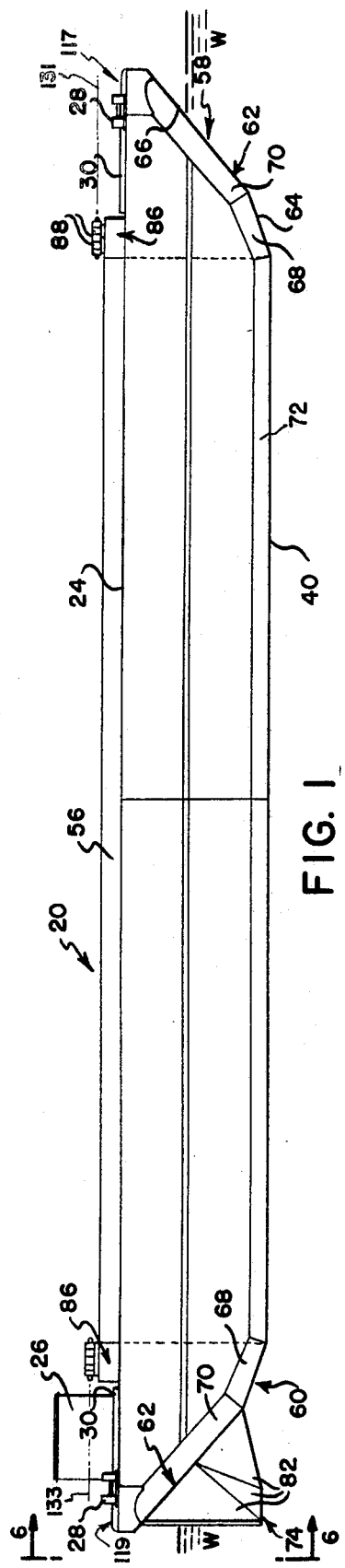
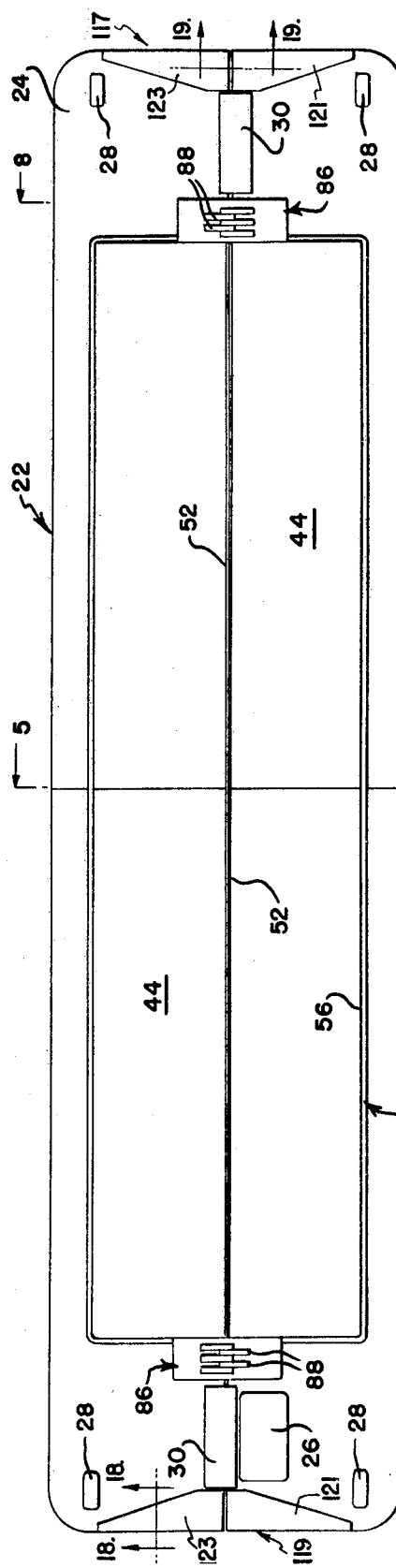
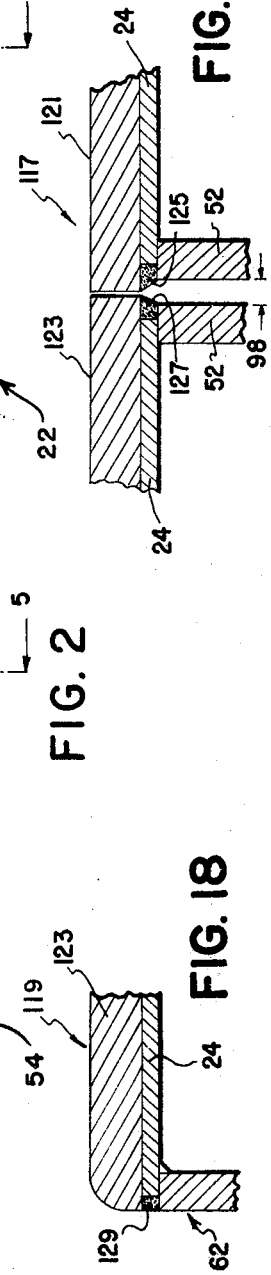
INVENTOR
REINK de BOER

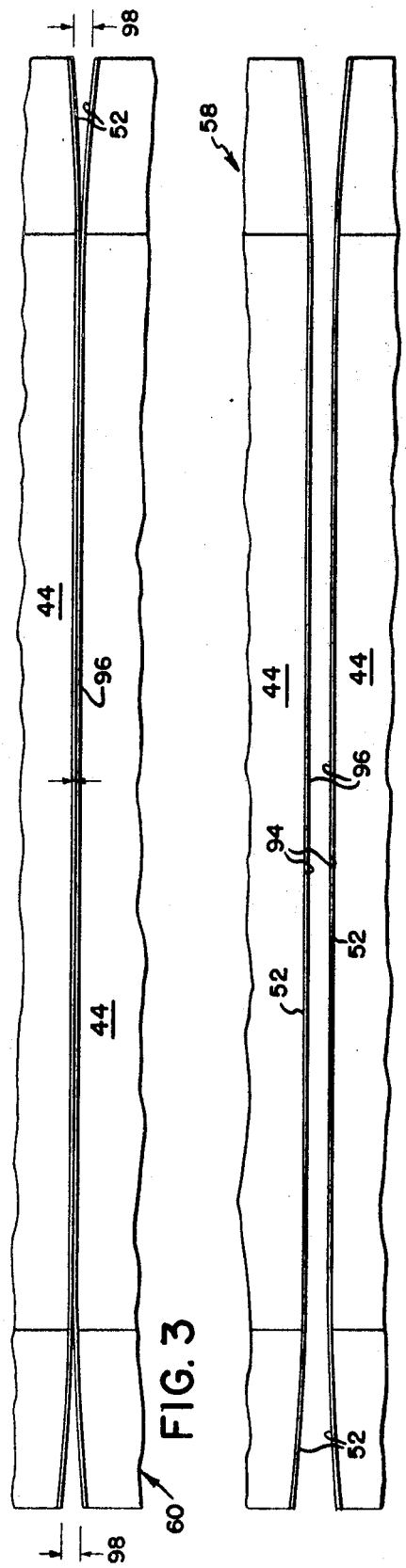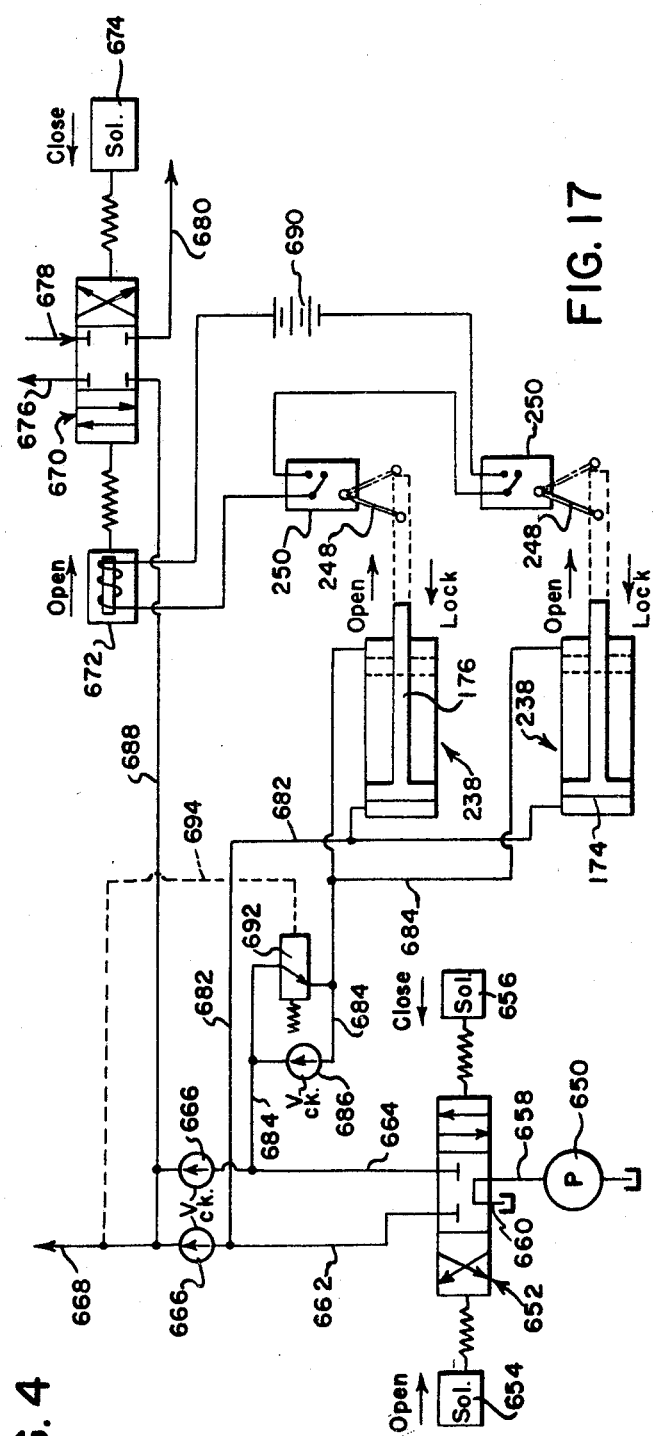

INVENTOR.
REINK de BOER

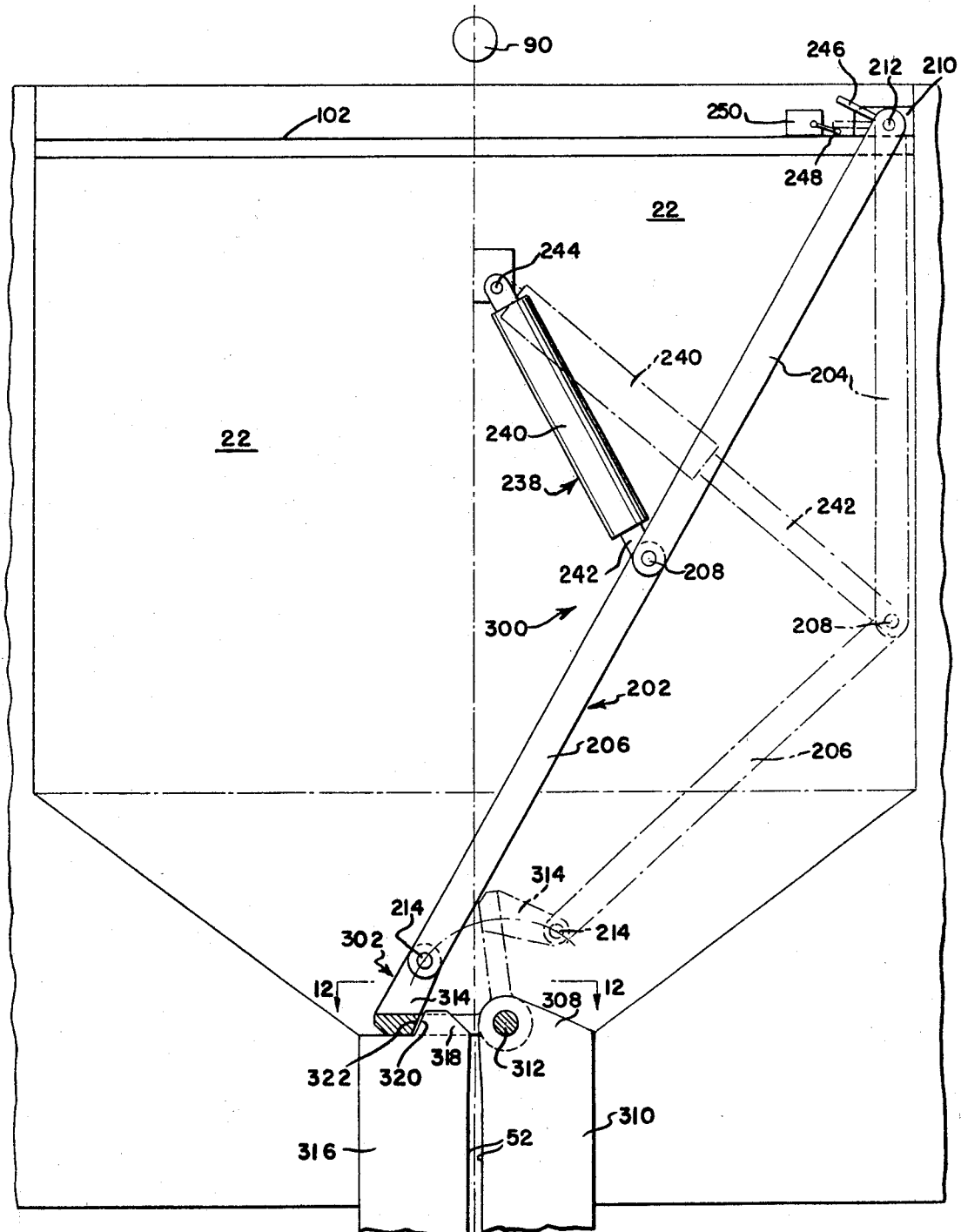
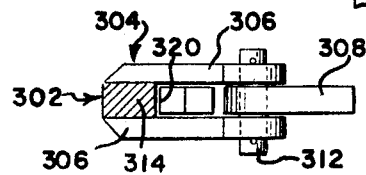
FIG. 11
FIG. 12
INVENTOR.
REINK de BOER

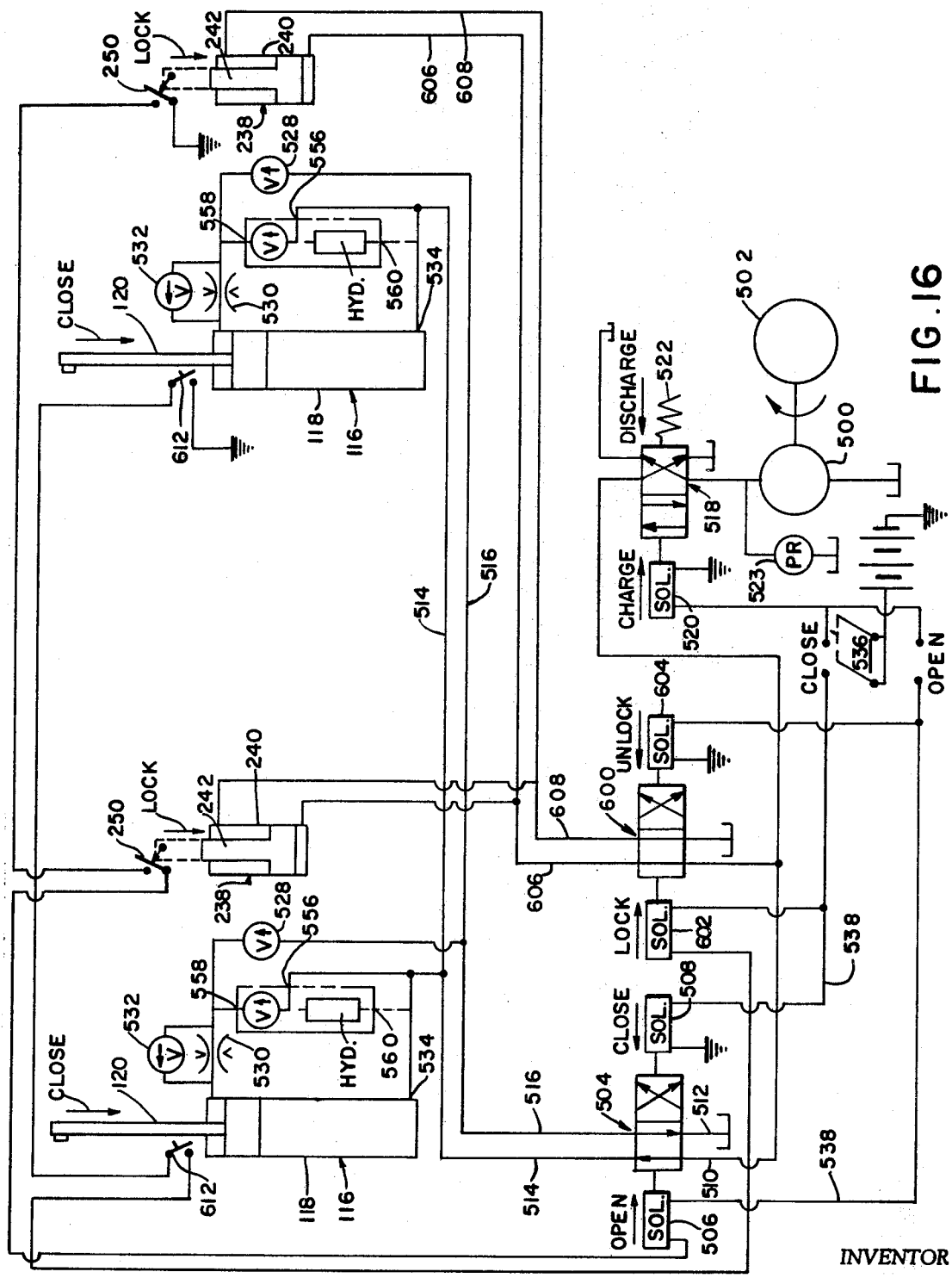

United States Patent Office 3,509,841
Patented May 5, 1970

3,509,841
SYSTEM AND APPARATUS FOR TRANSLATING
AND DISCHARGING A LOAD
Reink de Boer, Manitowoc, Wis., assignor to Manitowoc
Shipbuilding, Inc., Manitowoc, Wis., a corporation of
Wisconsin
Filed July 11, 1968, Ser. No. 744,179
Int. Cl. B63b 35/30
U.S. Cl. 114—29   23 Claims

ABSTRACT OF THE DISCLOSURE

A barge or scow for transporting and dumping material is comprised of a pair of pivotally connected sections which are so constructed and arranged that the sections assume a material transporting configuration when the barge is empty and a material dumping configuration when the barge is loaded. Means are provided for securing the section into the material transporting configuration. Means are also provided to define a seal between the sections to prevent inadvertant leakage or loss of material.

Background of the invention

The present invention relates to a system and apparatus for translating a load from one location to another and/or for discharging such load therefrom at a selected location.

More particularly this invention pertains to a vehicle having a plurality of complementary load carrying portions which may assume a plurality of attitudes or positions with respect to one another wherein the portions in one of the positions presents a preloading force with respect to each other for the vehicle to sustain substantially increased maximum loads that are not undesirably or inadvertantly diminished by leakage, seepage and the like, prior to discharging the load from the vehicle.

This invention more specifically pertains to a vehicle or to a vessel particularly adapted to be used on a body of water, for translating a load from one location to another, and/or for discharging such load therefrom wherein the vehicle or vessel is so constructed, configured and arranged as to present a plurality of complementary load carrying portions that inherently tend to assume at least one of a plurality of attitudes or positions with respect to one another, and inherently tend to assume another of said plurality of attitudes under the influence of a load with the portions in the one position presenting a preloading force with respect to one another, enabling the vehicle or the vessel to sustain substantially the increased maximum loads that are not undesirably or inadvertantly diminished by leakage, seepage and the like, prior to reaching a selected location, and being structurally associated with hydraulic assemblies for controlling the rate of and assisting the translation of the portions between the positions thereof, without necessitating the use of a constantly operable external power source, such as a diesel engine, and enabling the motion of the portions in being translated between the positions to be smooth and positive under any and all conditions, and further enabling the vehicle or the vessel to present substantially increased capacities for the aforesaid loads.

It is heretofore been suggested that dumping vehicles or vessels be provided for conveying earth, stone, garbage and other materials, and to dump or discharge these materials when a selected location or destination has been reached. The vehicles and the vessels, such as barges or scows, for performing these functions that are presently available are, for example, so constructed and arranged as to provide a number of wells at intervals throughout the length thereof. Pivoted dumping doors have been provided in the wells to support and dump the contents thereof, but the vehicles or vessels have been unsatisfactory because the dumping doors cannot readily be maintained in a condition to operate efficiently. In addition, the allowable area of each door is practically limited so that a large number of wells and dumping doors are necessary in a vehicle or vessel of given length.

In order to overcome the disadvantages as recited above, it has also been heretofore suggested that a vehicle in the form of a vessel such as a barge or scow be provided with a plurality of complementary buoyant parts particularly adapted, when in certain relative positions, to form a hold to receive the materials to be transported, and to assume automatically certain other positions in which the contents of the hold may be dumped. In the prior known type of vehicle or vessels, in order to retain the complementary parts in a load carrying position, mechanical restraining devices are usually mounted on the deck of the barge or scow. When the restraining device is released, the vessel portions tend to pivotally move apart so that the contents may be discharged. Little, if any, control over the rate of pivotal movement of the portions of the vessel is provided. Where some control for the rate of pivotal movement of the parts of the vessel is provided, additional mechanical devices are usually required, the same also being mounted on the deck of the barge or scow. Still further, while the complementary buoyant parts of the vessels are so constructed and arranged as to tend to assume a load carrying position, apparatus is required for completing the movement of the vessel parts to this position. Once again, the use of space on the deck of the barge or scow is necessitated. Moreover, in order to operate all of the mechanical devices and apparatus for performing the functions hereinbefore set forth, an external power source, such as a diesel engine or the like, is also mounted on the deck. Accordingly, it can be seen that notwithstanding the efforts made to overcome the disadvantages of the earlier dump barges or scows heretofore suggested, those presently available still provide limited carrying capacities. In addition, due to the quantity of equipment mounted on the deck thereof, the complementary buoyant parts of the vessels can only be loaded from one, or at the most, a very few directions.

In attempting to provide maximum load carrying capacities, dump barges or scows as are presently available are constructed of substantial longitudinal dimensional extents or lengths. Since the vessels are fabricated of sheet steel, or other similar material, enabling them to present this buoyant characteristic, it will be understood that a load applied to the bottom wall thereof, especially along the edges of such walls that may be disposed in mating mutual cooperative engagement with one another, thus defining the load carrying position of the vessels, will tend to bend the walls with the result that the load may be decreased by leakage, seepage and the like before the desired dumping or discharge location is reached. This has been found to be true notwithstanding the provision of a restraining device on the deck of the scow which tends to perform the function of maintaining the vessel parts in the load carrying position in the manner previously mentioned.

Summary of the invention

The present invention is directed toward vessels of substantial length of the type which comprise complementary sections connected together for relative movement between a material carrying position and a material discharging position. More particularly, means are provided for defining a seal between the vessel sections in order to minimize leakage, seepage or other loss of material between the vessel parts. In addition, means are provided for controlling the rate of movement of the sections with the respect to each other.

An object of this invention is to provide a vehicle of the type having a plurality of complementary buoyant load carrying portions that inherently tend to assume a load carrying position when empty and which inherently tend to assume a load discharging position when full.

Another object of the invention is to provide a vehicle of the type described providing a seal between the load carrying portions to preclude or minimize material loss therebetween when the vehicle is loaded.

Still another object of the invention is to provide a vehicle having pivotally connected load carrying portions defining a seal between the portions for precluding material loss therebetween.

A further object of the invention is to provide a vehicle comprised of a plurality of complementary load carrying portions interconnected by means controlling the rate of relative movement of the portions between load discharging positions and load carrying positions.

Brief description of the drawing

FIG. 1 is a side elevational view of a vehicle in the form of a vessel constructed in accordance with the principles of this invention;

FIG. 2 is a plan view of the vehicle or vessel of FIG. 1;

FIG. 3 is a detail view of certain component parts of the vehicle or vessel illustrated in FIGS. 1 and 2, wherein the component parts are illustrated in cooperative engagement;

FIG. 4 is a view similar to FIG. 3 but illustrating the component parts as being separably disposed with respect to one another;

FIG. 11 is a view similar to FIGS. 8, 9 and 10 but illustrating still another embodiment of the locking structure;

FIG. 12 is a cross sectional view taken substantially along line 12—12 of FIG. 11 as viewed in the direction indicated by the arrows;

FIG. 16 is a schematic view of a hydraulic circuit or system in which the locking structure is particularly intended to be disposed;

FIG. 17 is a schematic view of still another hydraulic circuit or system in which the locking structure is particularly intended to be disposed;

FIG. 18 is a cross sectional view of the vessel of FIGS. 1 and 2 taken substantially along line 18—18 of FIG. 2 as viewed in the direction indicated by the arrows; and FIG. 19 is a transverse cross sectional view of the vehicle or vessel of FIGS. 1 and 2 taken substantially along line 19—19 of FIGURE 2 as viewed in the direction indicated by the arrows.

Description of the preferred embodiment

Figure 5:
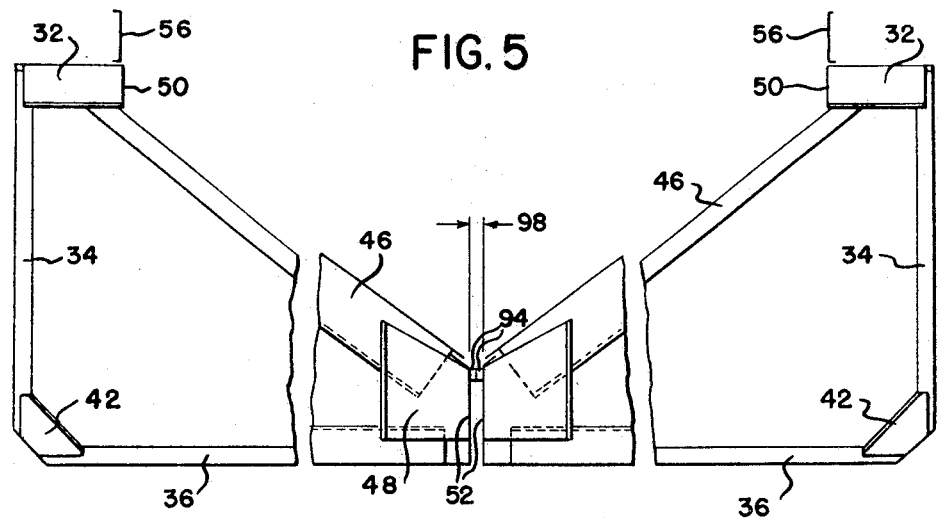
FIG. 5 is a cross sectional view, taken substantially along line 5—5 of FIG. 2, as viewed in the direction indicated by the arrows illustrating certain interior details of construction.

Attention is now directed to the drawing wherein there is illustrated a vehicle 20 for translating a load from one location to another and for discharging such load, if desired, at any selected location.

The vehicle 20 is illustrated in the form of a vessel for use on a body of water W but it is to be understood that other forms of vehicles which are employed for transporting and discharging loads of material may be provided with the principles of construction as disclosed herein without departing from the inventive concept hereof.

The vessel 20 comprises a plurality of long generally rectangular load carrying portions 22. Each of the portions 22 are of the same general configuration, and, therefore, are complementary with respect to one another. The portions 22 are adapted to be self-supporting on the body of water W, and therefore are fabricated of any suitable material for that purpose and may be considered as buoyant. Accordingly, the portions 22 define a plurality of complementary buoyant load carrying hull halves or portions to be described more fully hereinafter.

Each of the portions 22 of the vessel 20 comprise a generally horizontally disposed deck 24 and an engine house 26 on the deck 24, in which there may be disposed a power source, such as a diesel engine (not shown), and a pump (not shown). Additionally, mooring bitts 28 of any suitable construction may be fixed on the deck 24 for apparent purposes.

Other and additional equipment may be mounted on the deck 24, such as suitable gratings 30, for defining a walkway when the buoyant sections or hull halves 22 are disposed in a particular one of a plurality of positions, to be described more fully hereinafter. It is to be remembered that it is desirable to provide a vessel 20 having a substantially clear and unobstructed deck 24. Accordingly, as little additional equipment other than that described above is positioned thereupon.

Referring now to FIG. 5, each portion or hull half 22 is comprised of an upper frame member 32 that defines the surface or deck 24, a generally vertically frame member 34, and a longitudinal lower or bottom frame member 36. The frame members 34 define the sides 38, and the frame members 36 define the bottom 40 of the hull of the vessel 20. The frame members 34 and 36 are connected in any suitable manner, as by means of a gusset plate 42.

Additionally, each portion or hull half 22 is comprised of a generally downwardly and inwardly inclined load carrying wall 44 (FIGS. 2 and 8 of the drawing) defined by a similarly disposed frame member 46. The frame member 32 performs the function of a gusset plate to connect the member 46 with the member 34. A gusset plate 48 is provided at an opposite end of the frame member 46 to connect the same to the frame member 36.

Figure 6:
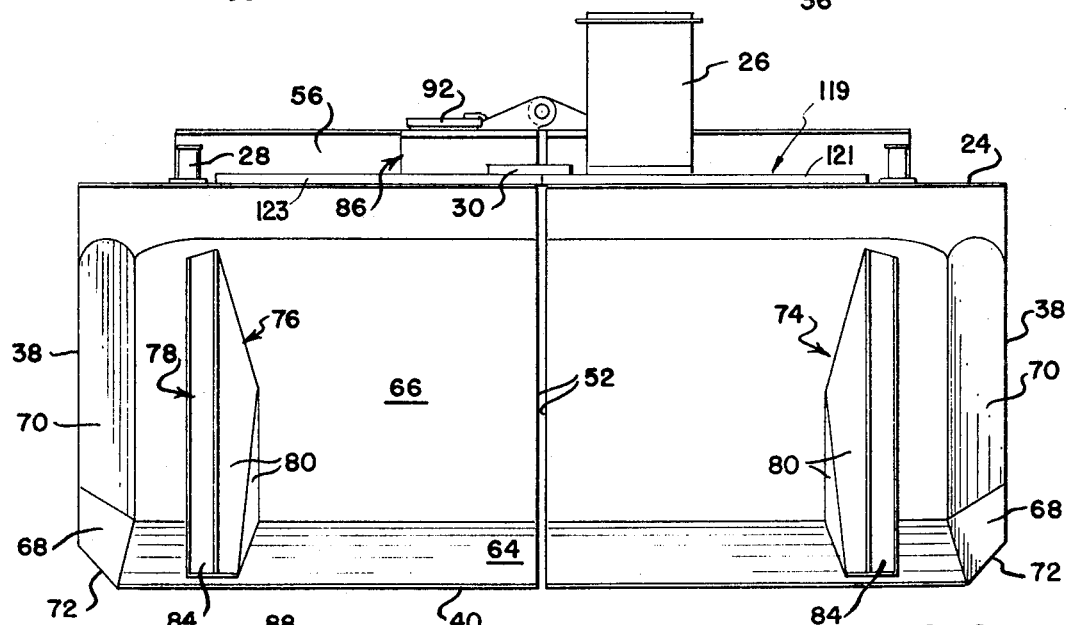
FIG. 6 is an end elevational view of the vehicle or vessel of FIGS. 1 and 2, taken substantially along line 6—6 of FIG. 1 as viewed in the direction indicated by the arrows.
Figure 8:
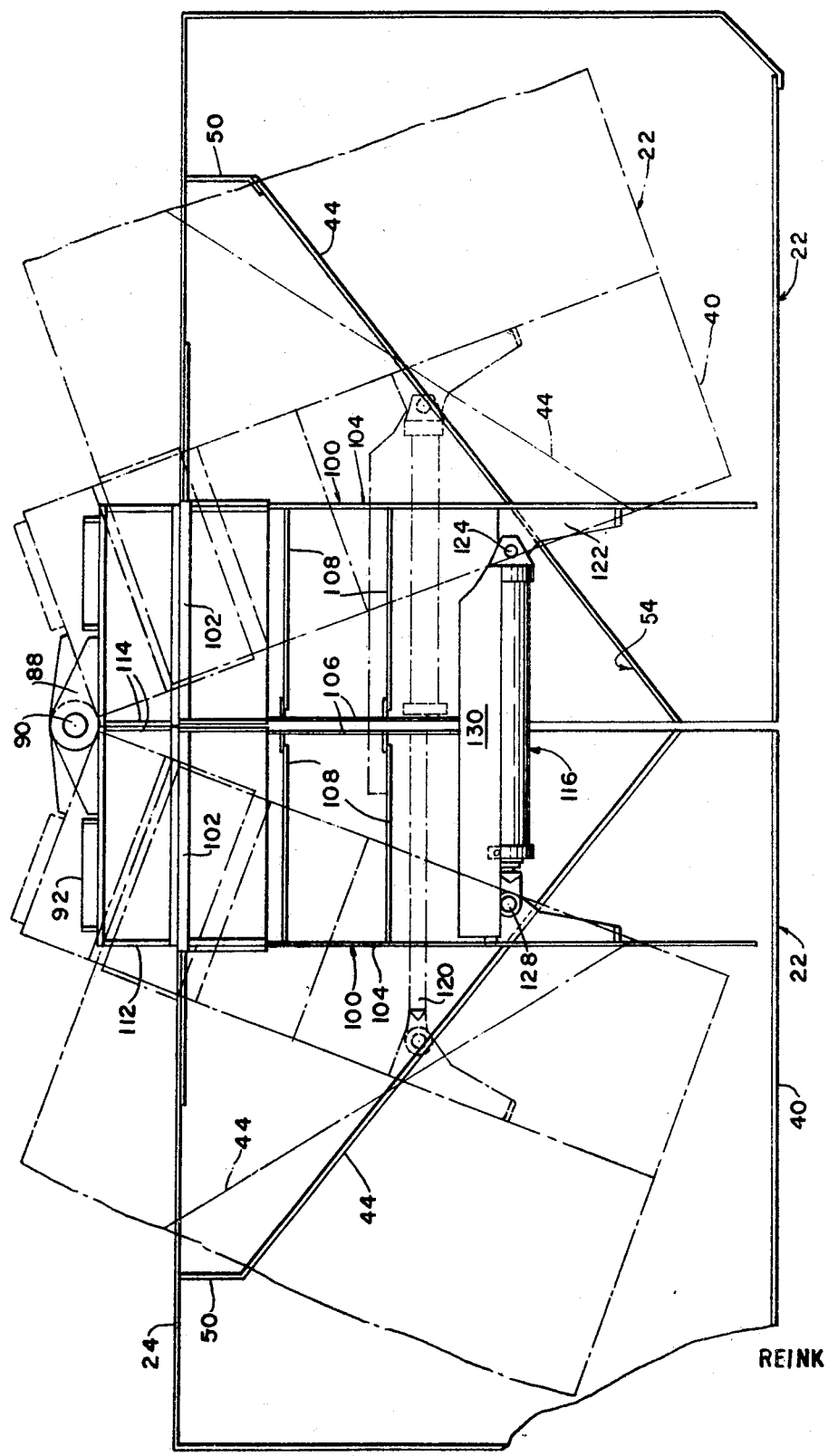
FIG. 8 is a cross sectional view of FIG. 2, taken substantially along line 8—8 thereof, as viewed in the direction indicated by the arrows and illustrating in solid lines certain component parts of the vehicle or vessel when disposed in a load carrying position and illustrating in dashed lines the component parts of the vehicle or vessel when disposed in a load discharging position.

It will now be seen that each portion or hull half 22 defines an area which is of generally triangular configuration in cross section. However, the frame member 46 is not extended to the frame members 32, 36. Accordingly, there is defined a generally vertically extending enclosure wall 50, and a generally vertically extending mating wall 52, these two walls being disposed generally in spaced parallel relationship with respect to one another (FIGS. 5, 6 and 8).

The enclosure walls 50 and the load carrying wall 44 define a generally triangularly configured enclosure 54 for retaining and confining a load therewithin, such as gravel, earth, stone, piping and the like. In order to preclude this material, and especially one having characteristics similar to a pulverulent material, from entering upon or obstructing the surface or deck 24, the wall 50 is extended generally vertically outwardly therefrom by means of a bulwark 56.

The vessel 20 comprises a bow or leading end 58 and a stern or trailing end 60. Each end is defined by the walls 38 and a bottom wall 62. The bottom wall 62 extends upwardly and outwardly from the bottom wall 40 and, in turn, is therefore defined by a plurality of wall surfaces 64 and 66 disposed in obtuse angular relationship with respect to one another. In addition, the surface 64 is disposed in obtuse angular relationship with respect to the wall 40, and the wall 66 in an acute angular relationship with respect to the surface or deck 24.

To enhance the ability of the vessel 20 to pass through the body of water W, that is, to further enhance the hydrodynamic characteristics thereof, a plurality of side surfaces 68 and 70 are disposed between the wall surfaces 64, 66 and the side walls 38. The side surfaces 68, 70 are disposed in angular relationship with the corresponding wall surfaces, as well as with the side walls. Carrying this hydrodynamic principle still further, an angularly disposed side wall 72 is disposed to extend between the bottom wall 40 and the side wall 38 to correspond generally with the length of the bottom wall 40.

In addition, each hull half 22 comprises a skeg 74, 76 associated with the trailing end 60, and connected with respect to the wall surfaces 66 of the bottom wall 62 thereof. Each skeg 74 is hydrodynamically configured and arranged, in accordance with the hereinbefore set forth principle. Accordingly each skeg comprises a pair of generally outwardly disposed walls 76, 78. Each of the walls 76, 78 are defined by a plurality of surfaces 80, 82 respectively The surfaces 80 may be angularly disposed with respect to one another, as are the surfaces 82. The specific degree of angularity between the surfaces 80, and between the surfaces 82, may be varied as desired, it being kept in mind only that the skegs 74 must be hydrodynamically designed to facilitate translation of the vessel 22 across the body of water W. The walls 76, 78 may be structurally operatively associated with one another in any suitable manner, as by means of an end wall 84.

Figure 7:
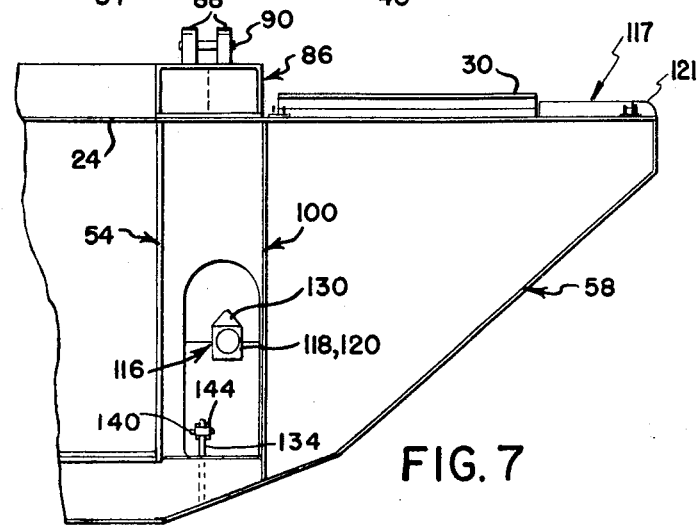
FIG. 7 is a partial side elevational view, illustrating certain interior details of construction of the vehicle or vessel of FIGS. 1 and 2.

With reference to FIGS. 7 and 8, it is a principle of the present invention that the portions or hull halves 22 inherently tend to assume the load carrying position and under the influence of a load inherently tends to assume the load discharging position. It is considered readily apparent that a body immersed in a fluid experiences a buoyant or lift force equal to the weight of the displaced fluid. This static lift force acts generally vertically through the center of gravity of the displaced volume, and the location on the body corresponding to the center of gravity of the displaced volume of fluid is called the center of buoyancy. If the center of buoyancy is aligned with the center of gravity of the object of body immersed in a fluid, then the body is in a position of equilibrium. However, if the center of gravity of the body or object immersed in the fluid is disposed generally outwardly of the center of buoyancy, then a turning force or moment will be created about the center of buoyancy. Accordingly, the object or body will tend to move and, more particularly, will tend to rotate.

If each of the portions 22 be considered as a body or object immersed in a fluid, the center of gravity thereof will be disposed outwardly of the center of gravity of the volume of fluid displaced thereby, and therefore generally outwardly of the center of buoyancy through which the aforesaid static lift force acts. Accordingly, a moment or turning force is introduced which enables each of the portions or hull halves 22 to inherently assume the load carrying position. However, if the enclosure 54 is loaded, then the center of gravity of one of the loaded portions 22 is positioned nearer the mating wall 52 than the center of gravity of one of the empty portions 22. Accordingly, the center of gravity of a combination of one hull half 22 and the load material disposed therein is positioned inwardly of the center of gravity of the volume of fluid W displaced thereby. As a result, a turning force or moment is introduced, inherently tending to move the portions 22 to the load discharge position.

In accordance with the above principles, the portions 22 are pivotally associated with one another in order to be translated between the aforesaid plurality of positions. To this end, a platform 86 is positioned upon the surface or deck 24 at the bow end 58 and at the stern end 60 substantially adjacent to the bulwark 56. A plurality of generally triangularly configured plates 88 are positioned upon each of the platforms 86 with each of the plates having an aperture (not shown) extending therethrough. The apertures are disposed in generally horizontal alignment with respect to one another to enable a pivot pin 90, to be disposed therein. It will be seen, therefore, that there is defined a hinge assembly enabling the hull halves 22 to pivot with respect to one another between the plurality of positions.

With reference to FIG. 6, it will be seen that the hinge assembly, comprising the platform 86, the plates 88, and the hinge pin 90, further comprises at least one hatch door 92, for a purpose to be described more fully hereinafter. This hatch door is not illustrated in FIG. 2, in order to facilitate an understanding of the present invention as illustrated in that figure.

The mating walls 52 define a generally vertically extending center line of the vessel 20. In addition, the hinge assembly is positioned along the generally vertically disposed center line thereof. It will be seen that the facility hereinbefore referred to for enabling the portions or hull halves 22 to inherently tend to assume each one of the aforesaid plurality of positions depends upon the location of the hinge assembly along this generally vertical center line. If the elevation of the hinge assembly relative to the deck 24 is increased, then the natural tendency of the complementary buoyant portions 22 to assume the discharging position will be increased. This is true even in the absence of a substantially decreased load or even a load of minimal proportions. However, it is desirable that the complementary buoyant portions 22 inherently tend to assume only the load carrying position in the absence of a load. Accordingly, the elevation of the hinge assembly relative to the deck 24 is decreased until the same is disposed substantially adjacent thereto. It is nevertheless to be remembered that the elevation of the hinge assembly relative to the deck 24 can be varied if it is desired to vary the inherent tendency of the portions 22 to assume either one of the positions. If it is desired to vary the elevation of the hinge assembly, then it will be further understood that the inherent tendency to assume at least one of the positions may require the expenditure of some power.

With reference now to FIGS. 2, 3, 4, 5 and 8, it will be noted that the mating walls 52 are disposed in juxtaposition with respect to one another when the complementary buoyant load carrying portions 22 are disposed in the load carrying position. When a load is disposed within the enclosure 54, a force is introduced that acts against the load carrying wall 44. This force can be resolved into a plurality of force components, one acting generally perpendicularly with respect to the load carrying wall 44, and the other acting along a plane parallel thereto. If the mating walls 52 were disposed in abutting mutual cooperative engagement with one another, the force component acting against the load carrying wall 44 would tend to bend or deflect it, particularly toward the medial portion of each hull half 22. Accordingly, it can be seen that an opening would result between the hull halves 22, through which the load of the stated material would tend to inadvertently and undesirably discharge.

It is a principal object of the present invention to insure that, when the buoyant load carrying portions 22 are in the load carrying position, the load disposed therewithin is not discharged until the desired load discharging location is reached. Accordingly, this invention comprehends the introduction of a pre-loading force at the mating walls 52 enabling the walls 52 to be disposed in a firm abutting relationship along the length thereof.

Accordingly, a mating bar 94 is mounted upon each one of the mating walls 52 at a location adjacent to the connection of the frame member 46 to the gusset plate 48. Each of the mating bars 94 define a mating edge 96 which extends along the longitudinal dimensional extent thereof. The edge 96 are preferably configured to abut intermediate the ends thereof prior to abutting at the ends in order to provide a seal therebetween. Accordingly, the edges 96 are cambered so as to present a substantially parabolic configuration. This particular configuration is preferred since the pre-loading force introduced by the bars 94 when end portions of the vehicle or vessel 20 are brought together will be substantially greater along the central portion thereof than adjacent the end portions. More particularly, since the portions 22 of the vessel 20 are clamped together only adjacent the end portions thereof the weight of the load tends to cause the portions 22 to twist toward an open position near the longitudinal center portion. By cambering the mating edges 94, the central portions are caused to meet first and as the end portions of the hull halves 22 are drawn closed they are twisted, prestressing the central portion thereof more tightly together so that the twisting force caused by the weight of the load is opposed by a greater force than if the mating edges 94 of the portions or hull halves 22 were not cambered. Therefore, by parabolically contouring or cambering the edges 96 of the bars 94, the pre-loading force introduced will be substantially uniform along the longitudinal dimensional extent thereof when the portions or hull halves 22 are disposed in the load carrying position and the barge is loaded. It is to be further understood that a parabolic curve or configuration is the theoretically perfect curve or condition but that it is difficult to achieve such curve or configuration in actual practice. It has been found that a suitable approximation may be obtained by a plurality of chordal segments, points of which intersect the true parabola. It is to be still further understood that the expression "generally parabolic contour," as used in the instant disclosure as well as the claims appended hereto is to be interpreted as comprising an approximation of such curve or configuration.

In accordance with the above construction, it will now be understood that, when the load carrying portions or hull halves 22 are disposed in the load carrying position, a load is precluded from inadvertent or undesirable discharge therefrom until the performance of this function is desired. This is particularly true since it is at the ends 58, 60 of the vessel 20 that the portions or hull halves 22 are brought together. The mating walls 52, which are fabricated as a plane surface, are actually twisted under the influence of the pre-loading force, generally medially of the longitudinal dimensional extent thereof, at which location the width of the bars 94 is a maximum. Of course the enclosure 54 is completely clear and unobstructed.

With respect to the ends 58, 60 of the vehicle or the vessel 20, it is not necessary that the portion of the mating walls 52 extending outwardly from the bulwark 56 and from the surface or deck 24 to the bottom wall 40 be disposed in an abutting relationship. Accordingly, this portion of the mating walls 52 is fabricated of a tapered configuration, enabling them to diverge from a location corresponding generally with the terminal points of the mating bars 94. At the latter location, the walls 52 define a space 98, the importance of which is stressed hereinafter. This dimension will increase as the portions or hull halves 22 pivot to the load discharging position. It will now be understood that the gratings 30 may extend traversely relative to the space 98, so that a walk-way is provided from one portion 22 to the other. Accordingly, the gratings 30 are so constructed and arranged as to be relatively movable with respect to the deck 24 of at least one of the portions 22.

In accordance with the above construction, the mating bars 94 may be disposed in horizontal alignment with respect to one another, so that they may be disposed in the aforesaid relationship. It is, however, within the ambit of the present invention to dispose the mating bars 94 in underlying relationhsip with respect to each other. The bars 94 are still cambered or contoured as hereinbefore set forth, so that the cambered mating edges 96 will be disposed in abutting engagment with one of the mating walls 52, and the other mating edge disposed in a similar relationship with respect to the other mating wall. A substantially uniform pre-loading force is then introduced along the length of that portion of the mating wall 52 corresponding with the same dimension of the mating bars 94. In such a configuration, a tortuous discharge path is defined from the enclosure 54, precluding inadvertent or undesirable discharge of a load from the enclosure 54.

It has hereinbefore been emphasized that the portions 22 inherently tend to assume the load carrying position when there is no load disposed within the enclosure 54. And, when a load is disposed within the enclosure 54, then the portions or hull halves 22 inherently tend to assume the load discharging position. It is within the concept of this invention to control the rate of movement of the hull halves 22 between the first and the second positions. It is within the scope of the invention to assist the portions 22 from one of the positions to another, and to maintain them in a selected intermediate position until the desired operation to be performed is completed. For example, when a load is to be discharged and the portions 22 are translated to the discharging position, the opening moment decreases as the discharge opening between the portions increases. Moreover, once the portions 22 have reached the discharging position, it is desired that they be maintained thereat until the load is completely discharged. Conversely, as the portions approach the load carrying position, the aforesaid closing moment decreases and it is desirable that they be assisted in reaching the load carrying position. In addition, once the mating edges 96 of the bars 94 contact one another it is necessary that a force be introduced at the ends thereof to dispose the mating bars 94 in the abutting relationship so as to introduce the pre-loading force hereinbefore described.

To this end, and with particular reference now to FIG. 8, each portion or hull half 22 comprises, still further, a housing 100 positioned at the bow and stern ends 58, 60 in juxtaposition to the enclosure 54 and in substantially underlying relationship with respect to the platform 86. Each housing 100 comprises an upper wall 102, mounted upon the deck 24. In addition, the housings 100 comprise a side wall 104 and an end wall 106. The end walls 106 are disposed in vertical alignment with the mating walls 52 and may be disposed in spaced parallel relationship with respect to one another when the portions or the hull halves 22 are disposed in the load carrying position. Each of the housings 100 are rigidified by means of generally horizontally extending braces 108 which are placed in parallel relationship with respect to one another and with respect to the roof or roof wall 102. It will be seen that the housings 100 are moved contemporaneously with the portions 22 and become separably disposed with respect to one another. The platform 86 further comprises a plurality of platform portions 110, 112 separated by an end wall 114. Accordingly, the platform portions 110 and 112 are moved with the hull halves 22, and separably disposed with respect to one another when the hull halves 22 are disposed in the load discharging position.

A hydraulic assembly 116 is positioned within the housings 100 at the bow end 58 and the stern end 60 of the vessel 20. The hydraulic assemblies 116 may be of any suitable construction and arrangement in order to control the rate of movement of the portions 22, to assist them in reaching either one of the positions, to maintain them at a selected intermediate position; and to urge the mating edges 96 together to form a seal.

An important feature in providing a seal between the portions 22 is stop means 117, 119 illustrated in FIGS. 1, 2, 6, 7, 18 and 19. The stop means 117, 119 may be identical and are each illustrated as comprising a pair of susbtantially identical generally triangular plates 121, 123. The plates 121, 123 are of substantial thickness and are secured by any suitable means including weldments 125, 127, to 129 to the deck 24.

From FIG. 19 it will be seen that the plates 121, 123 span the gap 98 and abut when the hull halves are in the load carrying position. More specifically, the plates 121, 123 are positioned to abut generally contemporaneously with the abutting of the mating edges 96. Although the plates 121, 123 may be arranged to abut prior to the instant of abutment of the mating edges 96, or immediately thereafter, it is preferred that the plates 121, 123 abut substantially simultaneously with the engagement of the edges 96.

Since the thickness of the plates 121, 123 is selected to preclude deformation thereof, continued actuation of the hydraulic assemblies 116 uses the stop means 117, 119 as a fulcrum to urge the edges 96 into a sealing relation. It is to be noted that the stop means 117, 119 are disposed beneath the axes 131, 133 of the pivot pins 90. Because of this disposition of the stop means 117, 119, the plates 121, 123 come into contact only when the hull halves 22 are in the load carrying position.

The hydraulic assembly 116 may take the form of a double-acting motor comprising a cylinder 118 and a piston-rod arrangement 120 reciprocally disposed in the cylinder 118. A mounting plate 122 is fixed on the side wall 104 of one of the housings 100 and the cylinder 118 is pivoted thereto, as by means of a pivot pin 124. Similarly, a mounting plate 126 is fixed on the side wall 104 of the other housing 100, and the piston and piston-rod arrangement 120 is pivoted thereto, as by means of a pivot-pin 128. The degree of movement of the portions 22 to the load discharging position is proportionate to the stroke of the piston 120 within the cylinder 118. Therefore, the area of the discharge opening defined between the portions 22 when disposed in the discharging position is proportionate to the stroke of the hydraulic assembly 116. It will be understood that the hydraulic assembly 116 may be chosen as having a stroke corresponding with the maximum discharge opening between the portions 22 since it is within the ambit of the present invention to vary the area of the discharge opening by terminating the travel of the piston-rod arrangement 120 within the cylinder 118 before it reaches the end of its stroke. A cover 130 is positioned upon the cylinder 118 of the hydraulic assembly 116 to preclude the load from fouling or in any other way deleteriously affecting the smooth, positive and controlled operation of the hydraulic assembly 116.

As pointed out hereinbefore, it is necessary to introduce a closing force at the end of the mating bars 94 in order to dispose them in the aforesaid abutting relationship to introduce the pre-loading force. This force is preferably provided by the hydraulic assembly 116 as actuated and controlled by the hydraulic circuits and auxiliary apparatus carried by the vehicle or the vessel 20 and shown in FIG. 14 and more fully and completely described below.

It may be desirable to provide a mechanical type of locking or latching apparatus 132 to supplement the hydraulic assembly 116 and to retain the portions or hull halves 22 in the load carrying position. The apparatus 132 allows the hydraulic pressure in the hydraulic assembly 116 to be relieved if the vessel 20 is to remain loaded for a substantial length of time or to provide a safety mechanism to maintain the portions 22 in the load carrying position if the hydraulic assembly 116 fails while the vessel 20 is loaded. In practice, however, it has been found that the locking or latching apparatus 132 is unnecessary during normal type operations.

Figure 9:
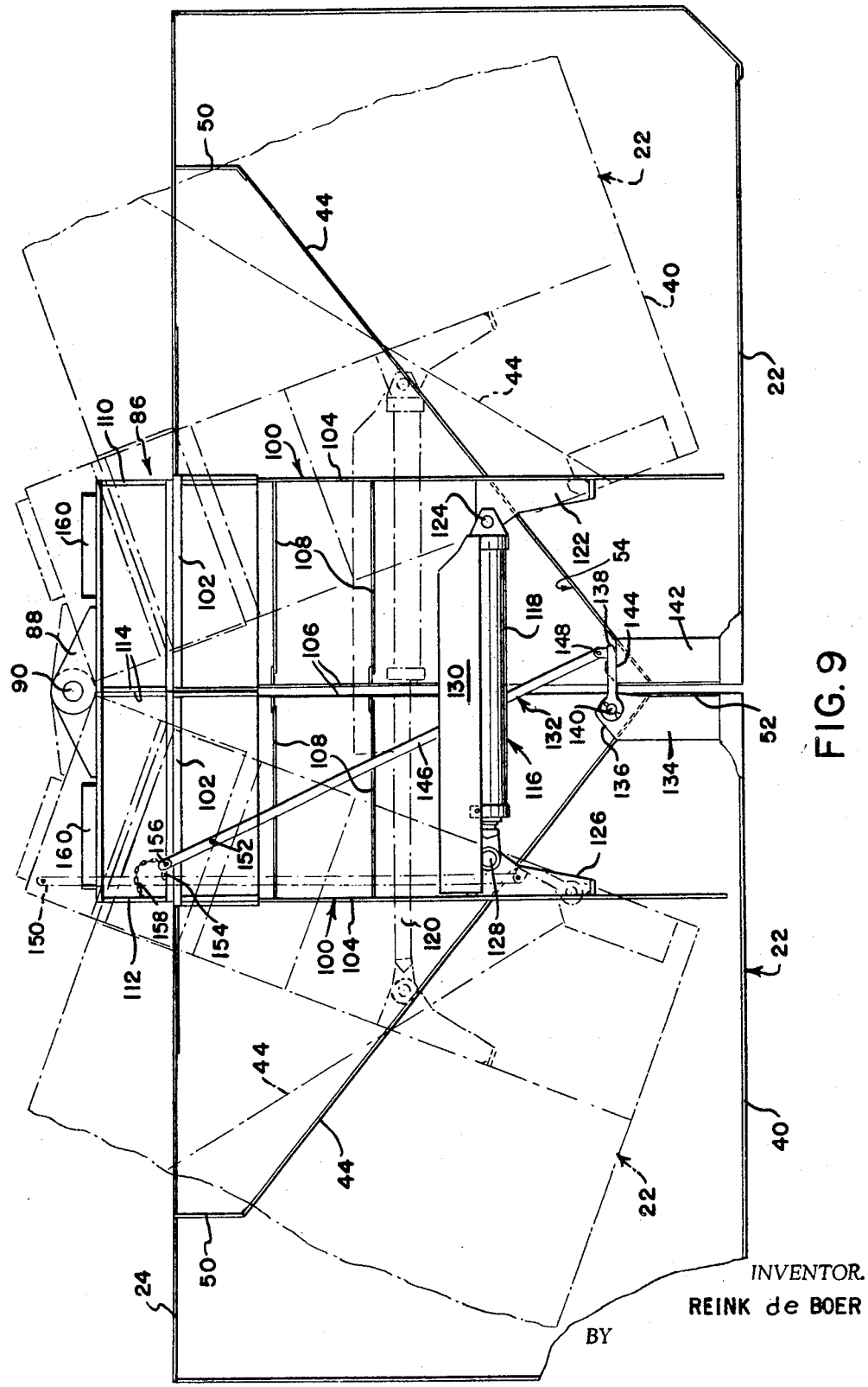
FIG. 9 is a view similar to FIG. 8 but illustrating one embodiment of a locking structure for retaining the component parts of the vehicle or vessel in the load carrying position.

Referring now to FIG. 9, one simple form of the locking or latching apparatus 132 is illustrated which may serve the above latching and safety functions. A hinge pad 134 is fixed on the bottom wall 40 of one of the portions 22 within the housing 100 corresponding thereto. The pad 134 is comprised of a generally triangular upper end 136 with an arm or clasp 138 pivoted to the apex thereof, as by means of a pivot pin 140. A lug pad 142 is fixed on the bottom wall 40 of the other portion 22 within the housing 100 corresponding thereto. The lug pad 142 is arranged to provide a lug 144 extending therefrom to cooperate with the clasp 138 in such a manner as to prevent pivotal movement of the portions 22 when the clasp 138 is positioned in the latching position, as shown in solid lines in FIG. 9, and to permit pivotal movement of the portions 22 when the clasp 138 is pivoted about the pivot pin 140 to a non-engaging position, as shown in phantom lines in FIG. 9.

A handle 146 is pivoted to the clasp 138 by means of a pivot pin 148 to provide an actuating means for positioning the clasp 138 in either the engaging or the non-engaging position. The handle 146 is provided at the other end with a plurality of apertures 150, 152. A bracket 154 fixed on the upper wall 102 is connected to the handle 146 by a pin 156 extending through the aperture 150. A keeper chain 158 may be provided for the pin 156. When it is desired to engage the clasp 138 with the lug pad 142 to lock the portions 22 together, the handle 146 is affixed by means of the pin 156 through the upper aperture 150 of the handle 146 to the bracket 154. When it is desired to move the clasp 138 to the non-engaging position to permit the portions 22 to separate, the pin 156 is withdrawn and the handle 146 is moved to align the aperture 152 with the bracket 154 and the pin 156 reinserted, thereby retaining the clasp 138 in the non-engaging position and allowing the hull halves 22 to move relative to one another. Access to the handle 146 may be provided by means of a hatch door 92.

Hydraulic or electrical operation of the clasp 138 may be provided to allow remote opeartion thereof rather than the manual operation above described. As hereinbefore mentioned, the locking or latching apparatus 132 has been found to normally be unnecesesary in practice, the hydraulic assembly 116 being sufficient to maintain the portions of hull halves 22 in the load carrying position. In actual practice, therefore, it has been found advantageous to provide a clearance between the clasp 138 and the lug 144 when in the engaged position to permit easier operation of the locking or latching apparatus 132 when such use is desired. When assembled in this manner, the locking or latching apparatus 132 is still capable of performing the safety function without unduly hindering the normal operation of the vessel 20.

Under other conditions, a more positive locking or latching apparatus may be desired, in order to supplement the closing force provided by the hydraulic assembly 116 or to maintain the closing force supplied by the hydraulic assembly 116 after the portions or hull halves 22 have been disposed in the load carrying position.

To this end, the hydraulic assembly 116 may be associated with a locking or latching apparatus 200, note FIG.

10, for bringing the mating edges 96 of the mating bars 94 into the aforesaid relationship to introduce the preloading force and for retaining the hull halves 22 in the load carrying position.

Figure 10:
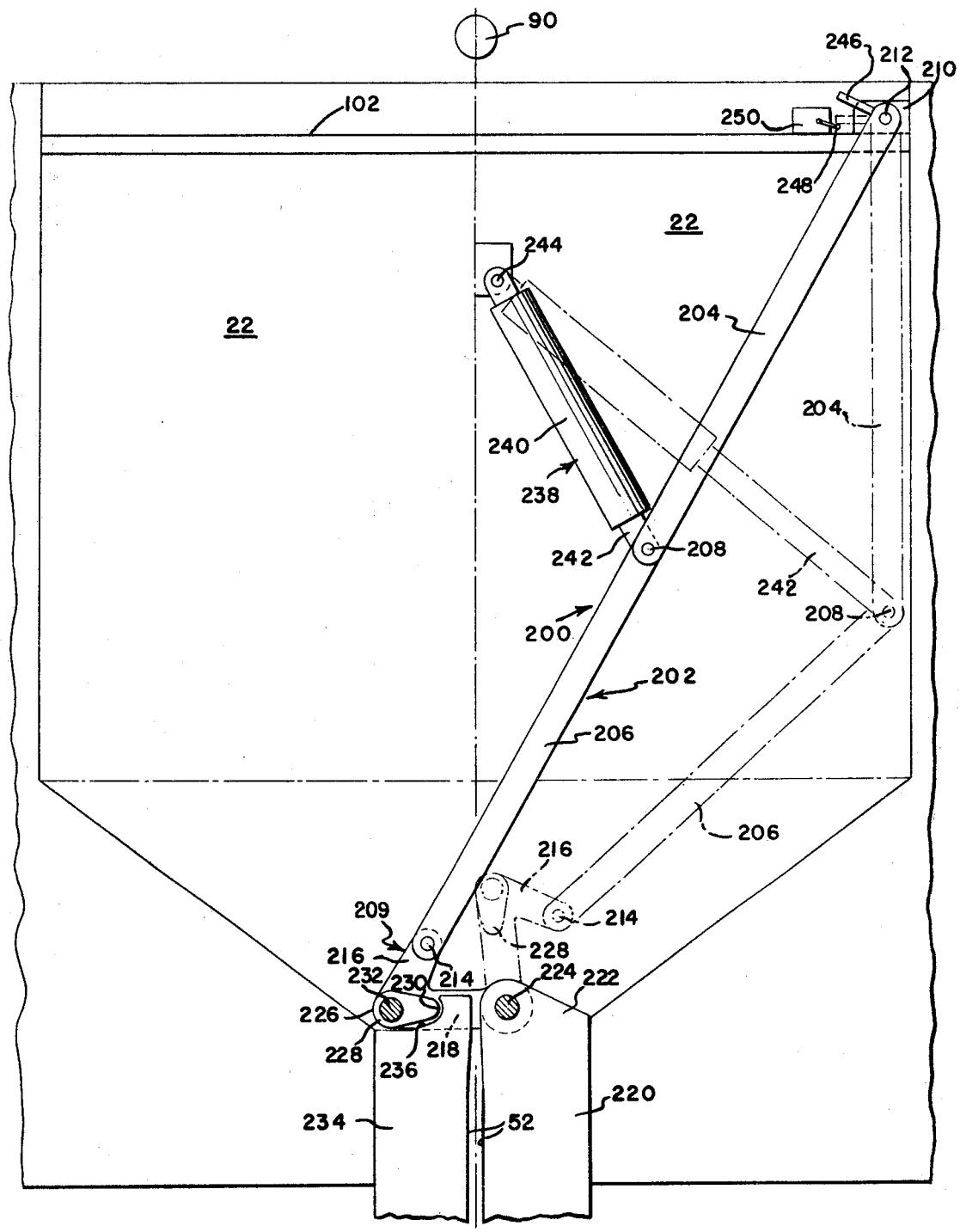
FIG. 10 is a view similar to FIGS. 8 and 9 but illustrating another embodiment of the locking structure.

With reference to FIG. 10, one embodiment of the locking or latching apparatus 200 is illustrated. It will first be understood that the locking or latching apparatus 200, and the other embodiments thereof illustrated in FIGS. 11 through 13 hereinafter to be described, are illustrated in full lines to indicate the position assumed by the component parts thereof when the portions 22 assume the load carrying position, and are illustrated in phantom to indicate the position assumed by the parts thereof when the portions 22 assume the discharging position.

The latching apparatus 200 comprises a linkage assembly 202 having a plurality of linking members 204 and 206 that are disposed in pivotal association with one another intermediate the ends of the linkage assembly, as by means of a pivot pin 208. The linking member 20 is pivotally associated with the roof wall 102 as by means of a bracket 210 and a pivot pin 212.

It is also to be noted that in FIG. 9 the locking or latching apparatus 132 is illustrated as extending generally downwardly and to the right from the bracket 154, while in FIG. 10, the locking or latching apparatus 200 is illustrated as extending from the pivot pin 212 generally downwardly and to the left. Thus, it will be realized that the locking or latching apparatus may be pivotally associated with the roof wall 102 of either one of the housings 100, and extend downwardly along an inclined plane to a location substantially adjacent the mating wall 52 on the other housing when the linkage assembly 202 is disposed in the full line position. The housings 100 themselves are not illustrated in FIG. 10, or for that matter, in FIGS. 11 through 13, to facilitate an understanding of the construction and arrangement of the locking or latching apparatus, and the manner in which they perform their function. It should also be likewise understood that the clasps 138 as illustrated in FIG. 9 may be pivotally associated with either one of the portions or hull halves 22.

The linking member 206 is connected to a linking arm 209 by a pivot pin 214. The arm 209 comprises a short leg 216 and a long leg 218 disposed in acute angular relationship. The leg 216 is pivotally connected to the same hull half 22 that the linking member 204 is connected. To this end a mounting block 220 is fixed on the bottom wall 40 of the portion 22 and comprises a generally triangular upper end 222 connected to the arm 218 by a pivot pin 224.

The arms 216 and 218 define a junction 226 with a toggle link 228 presenting an apex 230, pivotally connected to the junction 226 by a pivot pin 232. Another mounting block 234 is fixed on the bottom wall 40 of the other portion 22 within the housing 100 corresponding thereto. The block 234 provides a groove 236 defining a camming surface having a configuration corresponding generally with the peripheral configuration of the toggle link 228. The toggle link 228 is disposed within the groove 236 when the locking structure 200 is disposed in a locking position corresponding to the load carrying position of the portions 22. In addition, the toggle link 228 cooperates with the camming surface in such a manner to provide the closing force at the terminal ends of the mating bars 94.

The latching apparatus 200 comprises, still further, a double-acting hydraulic motor 238 having a cylinder 240 and a piston-rod arrangement 242. The cylinder 240 is pivotally connected by a pin 244 to the end wall 106 of the housing 100 to which the linking member 204 is connected. The piston and piston rod arrangement 242 is pivotally associated with the linking members 204, 206 at the point of juncture by the pivot pin 208. A contact lever 246 is rigidly fixed to the linking member 204 by the pin 212. The lever 246 engages the contact pin 248 of a lock signal limit switch 250, of any suitable construction, as the locking or latching apparatus 200 is translated to the unlocked position corresponding to the discharging position of the portions 22.

It is to be noted that the toggle link 228, and the camming surface of the groove 236 are so configured and arranged as to provide a maximum retaining force when the latching or locking apparatus 200 is disposed in the load retaining position. At the same time, the toggle link 228 and the camming surface of the groove 236 are configured to provide a rapid decrease in the force required to disengage the link 228 therefrom. It will be seen that the toggle link 228 is generally horizontally disposed in firm abutting engagement with the camming surface when the linkage assembly 202 is disposed in the retaining position. During the initial portion of the travel of the linkage assembly 202 to the releasing position, the toggle link 228 tends to pivot in a clockwise direction from the horizontal to the vertical. During this portion of the travel of the linkage assembly 202, a maximum releasing force is required, since it is during a corresponding portion of the travel of the toggle link 228 that the apex 230 is disposed in the firm abutting contact with the groove 236. The toggle link 228 rapidly approaches the vertical since the distance from the pin 232 to the groove 236 rapidly increases. Once the toggle link 228 approaches the vertical, the degree of contact with the groove 236 is substantially reduced, so that the force required to completely release the linkage assembly 202 is also substantially reduced. For all practical purposes it may be said that once the toggle link 228 approaches the vertical, the releasing force is reduced substantially to zero. It is emphasized, however, that this substantial reduction in the releasing force occurs during the initial portion of the travel of the linkage assembly 202 from the retaining position to the releasing position.

It will be seen that a substantial closing force is terminally required to dispose the latching or locking apparatus 200 in the retaining position, enabling the mating bars 94 to be disposed in the aforesaid relationship with respect to one another, to introduce the pre-loading force. It will be seen that a substantial releasing force is initially required to release the linkage assembly 202 of the latching or locking apparatus 200. Accordingly, the portions 22 are capable of being retained in the load carrying position even though a load of substantial magnitude is disposed within the enclosure 54. While the hydraulic assembly 116 may be relied upon to assist in retaining the portions or hull halves 22 in the load carrying position, leakage or failure of the hydraulic system will be of no effect since the latching or locking apparatus 200 is capable of maintaining the hull halves 22 in the load carrying position. In addition, if the vessel 20 is to remain loaded over an extended period of time, the latching apparatus 200 is capable of performing this function, thus eliminating the need for applying substantial pressures to the piston-cylinder 118, 120 over that period of time. Similarly, once the latching apparatus 200 is disposed in the retaining position, there is no need to apply constant substantial pressures to the hydraulic motor assembly 238. Of course, once it is desired to release the latching apparatus 200 it will be seen that the linkage assembly 202 provides a substantial mechanical advantage, enabling the performance of this function with facility. The converse is equally true, namely, the linkage assembly 202 provides a substantial mechanical advantage when it is desired to dispose the latching apparatus 200 in the retaining position.

With reference now to FIGS. 11 and 12, wherein like reference characters indicate like parts, another embodiment of a latching or locking apparatus 300 is illustrated. In lieu of the linking arm 209, the toggle link 228 and the groove 236, the latching apparatus 300 comprises a retaining assembly 302, having a bifurcated toggle link 304 and a plurality of legs 306 pivotaly connected to the upper end 308 of a mounting block 310, as by means of a pivot pin 312. An arm 314 extends upwardly from the legs 306 at an acute angle with respect thereto. The arm 314 is pivotally connected to the link 206 by a pivot pin 214.

The mounting block 316 comprises a lug 318 disposed at the upper end thereof defining a beveled surface 320 engageable with a similarly beveled surface 322 defined by the arm 314. The angle of these surfaces with respect to a vertical plane may be varied as desired. It is to be understood that the angle must be chosen to provide a substantial opening and closing force. Thus, as the surface 322 rides along, surface 320, a substantial force is initially required to release the retaining assembly 302, and to dispose the same in the retaining position. Once these surfaces are out of engagement, this force is substantially reduced and, for all practical purposes, approaches zero. The length of the surfaces 320, 322 determines the rate at which the force will be reduced. Accordingly, when the length of the surface is minimal, the terminal closing and the initial releasing force will rapidly increase and decrease. In all other respects, the operation of the latching apparatus 300 is substantially the same as the operation of the latching apparatus 200.

Figure 13:
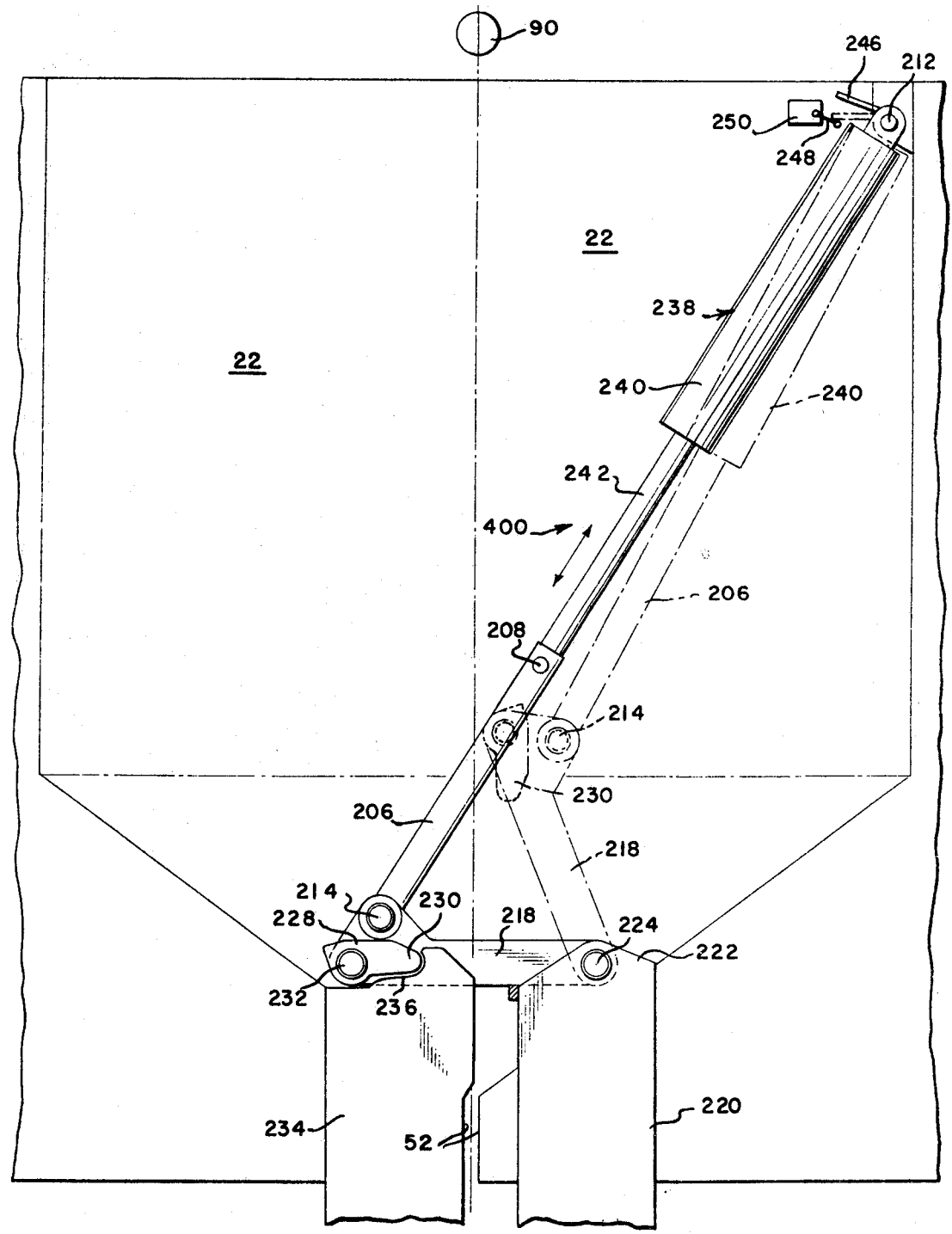
FIG. 13 is a view similar to FIGS. 8, 9, 10 and 11 but illustrating still another embodiment of the locking structure.

With reference to FIG. 13, wherein like reference characters indicate like parts, another embodiment of a latching or locking apparatus 400 is illustrated. In this embodiment, the force developed by the hydraulic motor assembly 238 is relied on, in lieu of the mechanical advantage presented by the linkage assembly 202 of the latching apparatus 200 and 300. Accordingly, the link 204 is eliminated, and the cylinder 240 of the assembly 238 disposed in its position. The piston-and-rod arrangement 242 is therefore connected to the link 206 as by the pin 208. Accordingly, the application of pressure fluid to the assembly 238 moves the arm 218 to the released position, as illustrated in phantom, and to the retaining position, as illustrated in full lines. The toggle link 228 operates in the same maner as does the toggle link 228 of the latching apparatus 200.

In the preferred embodiment of this invention, the hydraulic assembly 116 is utilized to provide the sole force necessary to develop and maintain the pre-loading force hereinabove mentioned. To this end, and with reference now to FIGURE 14, a suitable hydraulic circuit or system is illustrated for developing and maintaining the required fluid pressure in the hydraulic assembly 116. In describing this circuit, it will be understood, at the outset, that it is exemplary only.

Figure 14:
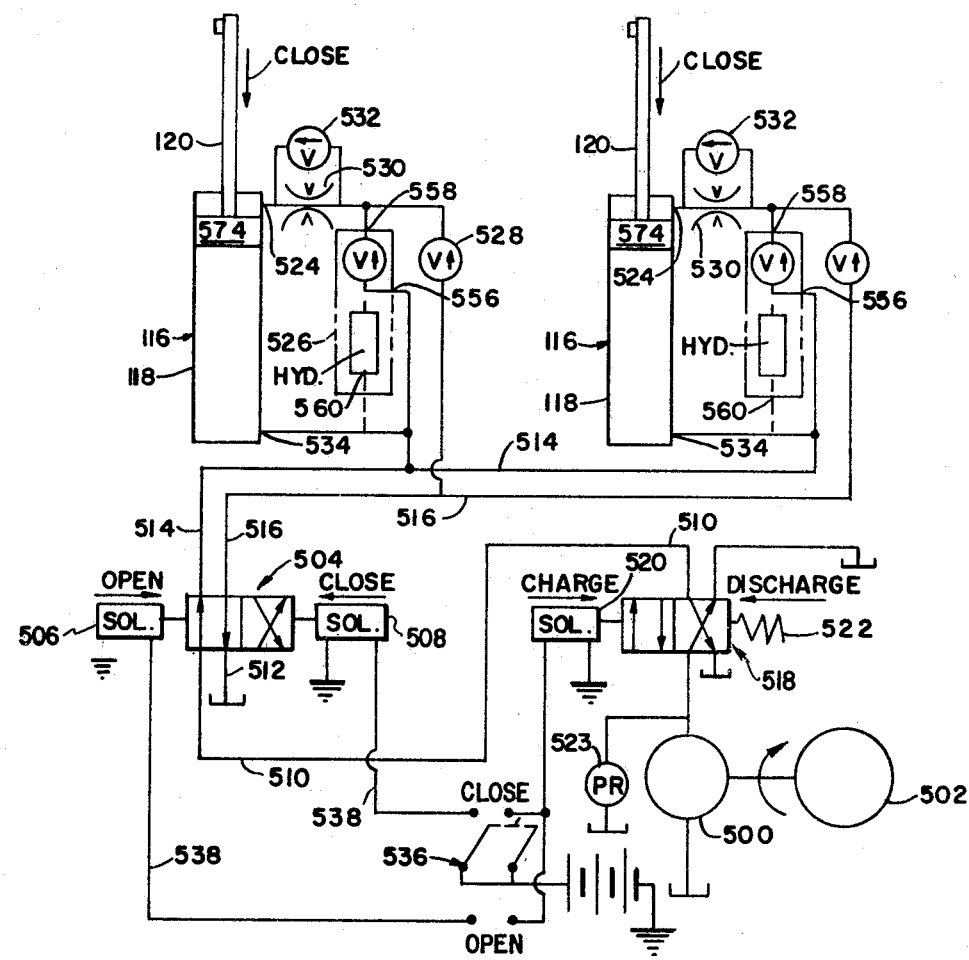
FIG. 14 is a schematic view of the hydraulic circuit or system for controlling the rate of movement of the load carrying portions and to provide locking apparatus for maintaining the portions in the load carrying position.

With continued reference to FIG. 14, the hydraulic circuit or system comprises a pump 500, of any suitable construction and arrangement, driven by an engine 502 also of any conventional design. In practice, it has been found that a diesel engine is particularly suitable for use in this invention, although a gasoline engine or any electric motor could appropriately be used. It is within the ambit of the present invention, as hereinbefore pointed out, that the hydraulic assembly 116 be operable from a remote location and to this end, hydraulic control valve 504 may be disposed in operative association with the pump 500. The hydraulic control valve 504 may be of any suitable construction, having solenoids 506, 508 for opening and closing the portions 22 of the vessel 20. Additionally, conduit means 510 places the inlet side of the valve 504 in communication with a pump control valve 518 with conduit means 514, 516 leading from the valve 504 to the cylinder 118 of the hydraulic assembly 116. Conduit means 512 provides communication between the outlet side of the hydraulic control valve 504 and a reservoir.

The pump control valve 518, of any suitable construction, is disposed in the conduit means 510 between the pump 500 and the hydraulic control valve 504. The pump control valve 518 is effective to charge the pump 500 through a solenoid 520 and discharge the same by means of a spring 522. The function of the pump control valve 518 is to unload the pump 500 when the pump 500 is not actually moving the piston rod 120 of the hydraulic assembly 116. Without the pump control valve 518, the fluid flow discharge from the pump 500 would be dumped over a relief valve 523, which may be a separate valve or may be integral with the pump 500, but the pump 500 would be operating at full load without doing any useful work.

The conduit means 514 is connected to a closing port 524 associated with the open end of the hydraulic assembly 116 through a pilot operated check valve 526. The conduit means 516 is connected to the closing port 524 through a one-way check valve 528 of any suitable construction. A variable restrictor valve 530 and a one-way check valve 532 are connected in parallel between the check valves 526, 528 and the closing port 524. The conduit means 514 is also directly connected to an opening port 534 in the closed end of the hydraulic assembly 116 and to a pilot port 560 of the pilot operated check valve 526.

In accordance with the hereinbefore set forth principle of operation from a remote location, an electrical control system is shown for operating the hydraulic control valve 504 and the pump control valve 518. This system comprises a control switch 536 and connecting electric wires 538. The control switch 536 may be a manually operated switch or may be a radio control switch to permit operation from a location remote from the vessel 20. If radio control is provided for the control switch 536, then radio control may also be provided for the engine 502.

Figure 15:
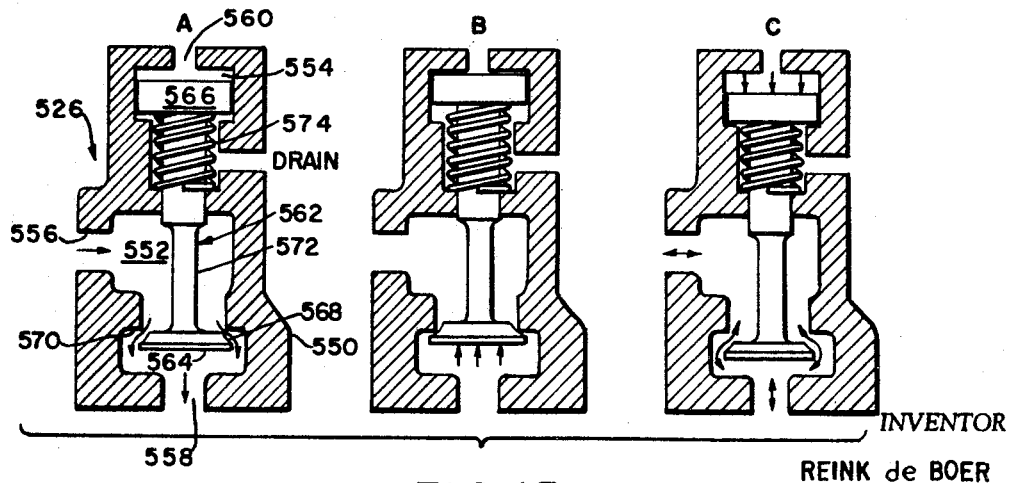
FIG. 15 is a cross sectional view of a pilot operated check valve suitable for use in the hydraulic circuit or system of FIG. 14.

One possible embodiment of the pilot operated check valve 526 is shown schematically in FIG. 15 wherein the pilot operated check valve 526 comprises a body 550 having a flow control chamber 552 and a pilot chamber 554 therein. An inlet port 556 and an outlet port 558 are provided within the body 550 to communicate with the flow control chamber 552. A pilot port 560 communicates with the pilot chamber 554. A valve member 562 having a valve head 564 positioned within the flow control chamber 552, and a pilot piston 566 positioned within pilot chamber 554 is positioned within the body 550. The valve head 564 is provided with a conical valving surface 568 which cooperates with a valve seating surface 570 found in the body 550 to preclude fluid flow through the flow control chamber 552. A valve stem 572 connects the pilot piston 566 to the valve head 564 of the valve member 562 and a bias in the form of a spring 574 is operatively associated with the valve member 562 to bias the valve head 564 into a closed position.

Referring now to FIG. 15A wherein the pilot operated control valve 526 is illustrated as operating as an ordinary or conventional check valve, it is seen that when fluid pressure is applied through the inlet port 556 into the flow control chamber 552, the fluid pressure overcomes the biasing effect of the spring 574, allowing the valve head 564 to move away from the valve seating surface 570 and to permit fluid to flow through the flow control chamber 552 from the inlet port 556 to the outlet port 558.

Referring to FIG. 15B, it is seen that when fluid pressure is applied to the outlet port 558, the valve head 564, is biased towards the valve seating surface 570, causing the pilot operated check valve 526 to close and prevent fluid flow from the outlet port 558 to the inlet port 556.

Referring now to FIG. 15C, it is seen that if pressurized hydraulic fluid is admitted through the pilot port 560 into the pilot chamber 554, the pilot piston 566 is moved against the biasing spring 574 which in turn moves the valve head 564 away from the seating surface 570. When fluid pressure is admitted to the pilot port 560, the pilot operated check valve 526 remains open regardless of the direction of fluid flow through the flow control chamber 552.

The pilot operated check valve 526 therefore operates as a conventional check valve permitting the fluid to flow from the inlet port 556 to the outlet port 558 while preventing fluid flow from the outlet port 558 back through the inlet port 556 when no pressure is admitted to the pilot chamber 554. When pressurized fluid is admitted to the pilot chamber 554, the pilot operated check valve 526 opens and permits the free flow of fluid through the flow control chamber 552 in either direction.

Referring again to FIG. 14, the operation of the hydraulic circuit or system will be readily apparent. The pump 500 provides a source of pressurized fluid for the hydraulic system. If the electric control switch 536 is moved to the "open" position, the solenoid 520 is actuated. This switches the spool of the pump control valve 518 towards the right, as seen in FIG. 14, thereby admitting pressurized fluid to the conduit means 510 of the hydraulic control valve 504. Movement of the control switch 536 to the "open" position also shifts the spool of the hydraulic control valve 504 towards the right, as seen in FIG. 14. The conduit means 514 is therefore supplied with the full pump pressure and the conduit means 516 is dumped to the reservoir through the conduit means 512. Control pressure from the conduit means 514 is therefore applied to the pilot port 560 and to the inlet port 556 of the pilot operated check valve 526 and therethrough to the closing port 524 of hydraulic assembly 116. This same control pressure is also applied to the opening port 534 of the hydraulic assembly 116. Because of the difference in cross sectional areas of the two sides of piston 574, the piston rod 120 moves toward the open position. As the piston rod 120 moves toward the open position, hydraulic fluid is forced out through the closing port 524 and through the variable restrictor valve 530 which controls the rate of movement since the one way check valve 532 is closed to prevent fluid flow therethrough. As hydraulic pressure is present at the pilot port 560, the fluid leaving the rod end of the hydraulic assembly 116 flows through the flow control chamber 552 and into the opening port 534 of the hydraulic assembly 116 thereby producing a regenerative action.

In a regenerative system, the hydraulic fluid leaving one end of a hydraulic cylinder is re-admitted to the other end thereof. In this instance, as the piston rod arrangement 120 of the hydraulic assembly 116 moves toward the open position, the fluid forced out through the closing port 524 is re-admitted through pilot operated check valve 526 into the opening port 534 of the hydraulic assembly 116. This fluid is supplemented by the hydraulic fluid being pressurized in the conduit means 514 by the pump 500. This supplemental fluid is necessary due to the fact that the cross-sectional area of the rod end of the piston 574 of the hydraulic assembly 116 is smaller, due to the presence of the piston rod arrangement 120 within the cylinder 118, than the cross-sectional area of the opposite end of the piston 574. The volume of fluid displaced by the moving piston 574 from the rod end of the cylinder 118 is therefore less than the fluid necessary to be admitted to the opposite end of the cylinder 118 to displace the piston 574. The variable restrictor valve 530 allows the rate of opening of the portions or hull halves 22 due to movement of the hydraulic assembly 116 to be regulated. The one way check valve 528 prevents the dumping of the fluid displaced out of the closing port 524 into the conduit means 516 and to the reservoir through the hydraulic control valve 504 and the conduit means 512.

As the portions or hull halves 22 have a tendency to move towards the open or unloading position when the vehicle or the vessel 20 is loaded, the work required to be done by the hydraulic fluid is at a minimum.

It is to be noted that the movement of the hydraulic assembly 116 towards the discharging position may be stopped at any time by merely removing the pump pressure from the pilot port 560 of the pilot operated check valve 526. This is accomplished either by stopping the engine 502 and the pump 500 or more preferably by moving the control switch 536 to a neutral position so that neither the close nor the open contact is energized. This will have the effect of releasing the solenoid 520 of the pump control valve 518. The bias 522 moves the spool of the pump control valve 518 to unload the pump 500 thereby relieving pump fluid pressure from the pilot port 560 of the pilot operated check valve 526.

Upon the removal of the hydraulic pressure from the pilot port 560 of the pilot operated check valve 526, the pilot operated check valve 526 functions as a conventional check valve preventing the discharge of hydraulic fluid from the closing port 524 into the conduit means 514. The one-way check valve 528 prevents the exhaust of hydraulic fluid from the closing port 524 into the conduit means 516. Regardless of the position of the hydraulic control valve 504, and whichever of the conduit means 514, 516 is connected to the conduit means 512, the hydraulic assembly 116 is prevented from moving toward the open position when no hydraulic pressure is applied to the pilot port 560 of the pilot operated check valve 526.

When the control switch 536 is moved to the "close" position, the solenoid 520 moves the pump control valve 518 to the pump charging or loading position and the solenoid 508 is actuated to move the control spool of the hydraulic control valve 504 toward the left, as seen in FIG. 14. Pump pressure is thereby applied to the conduit means 516 while allowing the conduit means 514 to dump to the reservoir through the conduit means 512.

The check valves 528 and 532 are opened by the pressurized hydraulic fluid in the conduit means 516, thereby admitting pressurized hydraulic fluid into the closing port 524 and moving the hydraulic piston rod arrangement 120 toward the close position. The pilot operated check valve 526 operates as a conventional check valve, preventing the dumping of fluid from the conduit means 516 and the rod end of the hydraulic cylinder 118 back into the conduit means 514. The fluid present behind the piston 574 in the hydraulic cylinder 118 is exhausted through the opening ports 534 into the conduit means 514, through the hydraulic control valve 504, into the conduit means 512, and back into the reservoir. Since the pilot port 560 of the pilot operated check valve 526 is connected through the conduit means 514 and 512 to the reservoir, no pressure is present at the pilot port 560, and the pilot operated check valve 526 operates as a conventional check valve.

When the hydraulic assembly 116 has moved to the fully closed position, and the preloading force is applied to the portions or hull halves 22, the control switch 536 is opened and the pump 500 stopped. As pointed out above, the hydraulic system and particularly the pilot operated check valve 526 and the one-way check valve 528, maintain the hydraulic assembly 116 and the portions 22 in the fully closed position, without permitting any release of hydraulic pressure from the hydraulic assembly 116.

As pointed out above, the portions 22 when unloaded have a tendency to move towards the closed position. If no hydraulic control circuit or system, the tendency of the hull halves 22 to move to the closed position may be utilized by itself to close the vessel 20. The operation under these circumstances is as follows: if the control switch 536 is moved to the close position with the pump 500 inoperative, the solenoid 508 moves the spool of the hydraulic control valve 504 towards the left, as seen in FIG. 14. The tendency of the portions 22 to move towards the closed position applies a closing force to the hydraulic assembly 116, thereby applying a greater hydraulic pressure to the opening port 534 than exists at the closing port 524. A portion of the fluid exhausted from the opening port 534 is permitted to pass through the pilot operated check valve 526 and the check valve 532 into the closing port 524. The excess fluid is dumped through the conduit means 514 and 512 into the reservoir. If the fluid flow from the conduit means 514 to the conduit means 512 is interrupted, as by opening the control switch 536, the excess fluid is not dumped from the hydraulic cylinder 118 and any further movement thereof will cease.

With reference now to the embodiments of the invention illustrated in FIGS. 10 through 13, it is now considered readily apparent that, when it is desired to enable the portions 22 to move to the discharging position, it will be necessary to first release the latching apparatus 200, 300 or 400, respectively, if the latching apparatus 200, 300, or 400 are employed in combination with the hydraulic assembly 116.

In the following description and disclosure, for the sake of brevity, reference will be made solely to the latching apparatus 200, illustrated in FIG. 10, but it is to be understood that it may also refer to the latching apparatus 300 or 400 of FIGS. 11 and 13, respectively. To this end, and with reference now to FIG. 16, one embodiment of a hydraulic system suitable for use with the embodiments of the invention is illustrated in FIGS. 10 through 13, which incorporates the circuit of FIG. 14, but has in addition, circuitry and controls for actuating the double acting hydraulic motor 238 of the latching apparatus 200 and synchronizing the operation thereof with the operation of the hydraulic assembly 116. Like reference numerals as used in FIG. 14 are used in FIG. 16 to indicate like portions of the hydraulic system or circuit.

In addition to the components shown in FIG. 14, the embodiment of FIG. 16 further comprises a lock control valve 600, suitable construction, having a lock solenoid 602 and an unlock solenoid 604. The lock control valve 600 is disposed in fluid communication with the conduit means 510 and provides a plurality of outlet means 606, 608 which are in fluid communication with the cylinders 240 of the double acting hydraulic motors 238. Each of the limit switches 250 is so positioned to be closed when the respective double acting hydraulic motor 238 is in the fully unlocked position. The limit switches 250 are operatively associated with an open solenoid 506 to prevent actuation of the solenoid 506 if the double acting hydraulic motors 238 are not in the fully unlocked positions. A close signal control switch 612 is likewise operatively associated with the hydraulic assembly 116 and the lock solenoid 602 to prevent operation of the lock solenoid 602 if the hydraulic assembly 116 is not in the fully closed position.

The operation of the hydraulic circuit or system of FIG. 16 should now be readily apparent. If the portions 22 are in the discharging position, if the pump 500 is running and if the control switch 536 is moved to the closed position, the solenoid 508 and the solenoid 520 are actuated. Actuation of the solenoid 602 is prevented by the open close signal control switch 612. The hydraulic assembly 116 then commences movement towards the closed position as described above. When the hydraulic assembly 116 reaches the fully closed position, the close signal control switch 612 is operated to thereby operate the solenoid 602 which moves the spool of the lock or latch control valve 600 towards the right, as seen in FIG. 16. The conduit means 510 will therefore be in fluid communication with the outlet means 606 causing the respective double acting hydraulic motor 238 to move towards the latched or locking position.

Once the latching apparatus 200 has been moved to the fully latched position, no further hydraulic pressure is necessary to retain this position. The engine 502 may therefore be shut down and the hull halves 22 remain locked in the load carrying position. When it is desired to move the hull halves 22 towards the discharging position, movement of the control switch 536 to the open position energizes the unlock solenoid 604 and the solenoid 520. The solenoid 506 is prevented from operating by action of the limit switch 250. Actuation of the unlock solenoid 604 moves the spool of the lock or latch control valve 600 towards the left, in FIG. 16, thereby placing the conduit means 510 in fluid communication with the outlet means 608. The respective double acting hydraulic motor 238 therefore moves toward the unlock position and upon attaining a fully unlocked position closes the limit switch 250. This in turn permits the solenoid 506 to operate which in turn causes the opening of the hydraulic assembly 116 as hereinabove described.

With reference now to FIG. 17, an alternate embodiment of an exemplary hydraulic circuit or system for actuating and releasing the latching apparatuses 200, 300 and 400 is illustrated. While a circuit is not illustrated for the piston-and-cylinder combinations 118, 120 of the hydraulic assemblies 116, it will be understood that the use of any suitable circuit may be invoked which is associated with the circuit illustrated in which the latching apparatus 200, 300 or 400 is disposed.

With continued reference to FIG. 17, the circuit comprises a pump 650, of any suitable construction, disposed in the engine house 26. Since the hydraulic assemblies 116 may be operated from a remote point, a hydraulic control valve 652 is disposed in operative association with the pump 650. The valve 652 is illustrated as having an open solenoid 654, and a close solenoid 656. Additionally, thte valve 652 preferably provides an inlet means 658 from the pump 650, an exhaust means 660 directed to any suitable point such as a tank (not shown), and a plurality of outlet means 662, 664. A one-way check valve 666 of suitable construction is disposed in each of the outlet means 662, 664.

The pump 650 is used to supply pressure fluid to the hydraulic motor assembly 238 of the latching apparatus 200 and to an accumulator section 668 of a hydraulic circuit to the combinations 118, 120 (not shown, as heretofore pointed out). The latter hydraulic circuit may have a hydraulic control valve (not shown) that controls the application of pressure fluid from the accumulator section 668 to and from the combinations 118, 120 of the hydraulic assemblies 116. The operation of this control valve, in turn, is controlled by a hydraulic control valve 670 illustrated in FIG. 17. The control valve 670 preferably comprises an open solenoid 672, and close solenoid 674. Additionally, the control valve 670 directs fluid from the pump 650 to the control valve (not shown) that controls the application of pressure fluid from the accumulator section 668 to the combinations 118, 120 by means of an outlet means 676, 678. The control valve 670 directs exhaust fluid through an exhaust means 680, which may be directed to the same location as the exhaust means 660 of the control valve 652.

When it is desired to release the latching apparatus 200, the open solenoid 654 of the control valve 652 is operated, for example, by means of a button control disposed at a remote point (not shown). The inlet 658 is thus connected with the outlet 662, enabling the pump 650 to supply pressure fluid to the accumulator section 668 and simultaneously through the passage 682 to the motors 238 to move the latching apparatus 200 to the released position. Fluid pressure from the other side of the motors 238 is communicated to the exhaust means 660 through the outlet means 664 and the passage 684 which provides a one-way check valve 686 therein. Pressure fluid from the pump 650 is also communicated to the control valve 670 through a passage 688, but is precluded from flowing to the outlet 676 since the valve 670 is disposed in a position to preclude such flow.

The operation of the latching appartus 200, as well as the latching apparatuses 300 and 400, is considered readily apparent from the hereinbefore set forth description thereof. As the linkage assembly 202 nears the termination of the travel to the released position, illustrated in phantom in FIG. 10, the contact link 246 which is nonrotatably associated with the link 204, approaches the contact pin 248 of the switch 250. Each of the switches 250, as illustrated in FIGURE 17, is disposed in a circuit that is operably associated with the solenoid 672 of the hydraulic control valve 670. When the contact pins 248 move to the dotted line position, an electrical circuit including a battery 690 is completed. The hydraulic control valve 670 is therefore moved by the solenoid 672 to a position providing communication from the passage 688 to the outlet 676 which, in turn, operates the hydraulic control valve (not shown) that controls the application of pressure fluid to the combinations 118, 120 from the accumulator section 668.

The latching apparatus 200, 300 or 400, having now been released, and pressure fluid supplied to the hydraulic assemblies 116 from the accumulator section 668, it is apparent that the hull halves 22 inherently tend to assume the discharging position under the influence of the load disposed within the enclosure 54. As pointed out, the hydraulic assemblies 116 control the rate of translation of the portions or hull halves 22 to the second position of discharge. At the same time the movement of the portions 22 to the discharging position may be terminated at any desired point to vary the area of the discharge opening defined thereby and therebetween. This is accomplished, for example, by providing an over-ride control at the aforesaid remote point for breaking the circuit in which the solenoid 672 is disposed.

When it is desired to enable the portions 22 to inherently return to the load carrying position, it is merely necessary to operate the solenoid 674 of the control valve 670. This may be accomplished in any suitable manner, as by providing a button control therefor at the remote point. Pressure fluid previously supplied to the hydraulic assemblies 116 from the accumulator section 668 is exhausted through the exhaust means 680. Alternatively, the circuit in which the accumulator section 668 is disposed, may be a regenerative circuit enabling pressure fluid to be circulated to the other side of the hydraulic assemblies 116, as well as enabling additional pressure fluid to be supplied to the other side from the accumulator section 668, rather than exhausting fluid by the exhaust means 680. At the same time, the solenoid 656 of the control valve 652 is operated to provide communication between the inlet means 658 and the outlet means 664, and to provide communication between the outlet means 662, and the exhaust means 660. Fluid flow occurs through the one-way check valve 666 disposed in the line 664 to the accumulator section 668 to maintain the pressure therein. At the same time, pressure fluid is communicated through the passage 684 to a sequence valve 692 which is movable to an open position from a normally closed position when the pressure in the accumulator section 668 reaches a predetermined volume.

To this end, a reference pressure line 694 is disposed between the section 668 and the sequence valve 692. As the hull halves 22 are translated to the load carrying position, as the pressure in the accumulator section 668 increases. When the mating edges 96 of the mating bars 94 contact one another, the pressure in the accumulator section 668 and in the reference line 694 reaches a value corresponding with the pressure at which the sequence valve 692 is set. Upon the operation of the sequence valve 692, pressure fluid from the line 664 is communicated to the motor assemblies 238, tending to move the latching apparatus 200, 300, 400 to the retaining positions. Pressure fluid previously communicated to the other side of the motor assembly 238 will be exhausted by means of the passage 682, the outlet means 662 and the exhaust means 660. It is apparent that pressure fluid from the accumulator section 668 cannot exhaust by the outlet means 662, in view of the provision of the one-way check valve 666.

It will now be understood that the pump 650 need not be in constant operation nor is the prime mover therefore required to be in constant operation. With regard to the hydraulic circuit illustrated in FIG. 17, the pump 650 is rendered operable only during the translation of the hull halves 22 to one or the other of the first or second positions. This is particularly true since the accumulator section 668 can be so designed and arranged as to provide sufficient pressure fluid to retain the portions 222 in either one of the positions once the desired position has been reached. When the circuit in which the accumulator section 668 is disposed is a regenerative type of circuit that uses its own pressure fluid, it is only necessary to render the pump 650 operable when the accumulator section 668 is being charged with fluid. This may be accomplished when the vessel 20 is being loaded. Once sufficient pressure fluid has been introduced therewithin, the pump 650 may be rendered inoperable, and only the hydraulic control valves 652 and 676 operated to provide the proper direction of fluid flow. In this connection, it is noted that both the hydraulic circuit in which the accumulator section 668 is disposed, and the circuit in which the latching apparatuses 200, 300, 400 are disposed will be supplied with fluid from the accumulator section 668.

The above construction comprehends the use of the limit switches 250, only when the latching apparatus 200, 300, 400 is moved to the released position. The hydraulic circuit in which these structures are disposed relies upon the building up of pressure in the accumulator section 668 when the hull halves 22 have returned to the load carrying position, and the mating edges 96 of the mating bars 94 are brought into contact with one another. It will now be understood that pressure may be increased due to other causes, which may prematurely cause the sequence valve 692 to be rendered operational, as when some object is disposed between the mating walls 52.

Accordingly, it is within the present invention that a limit switch (not shown), such as the switch 250, be disposed in association with the hydraulic assemblies 116. These switches are to be rendered operable only when the aforesaid hydraulic assemblies 116 reach the end of the stroke in a hull closing direction.

It should now be understood that, once the latching apparatus 200, 300, 400 is released, overcoming the aforesaid uniform pre-loading force, the hydraulic assembles 116 control the rate of movement of the hull halves 22 as they inherently tend to assume the load discharging position under the influence of the load. Thus, the translation of the portions 22 are smooth, controlled and positive under substantially any and all conditions. This may be accomplished in any suitable manner, as by disposing a flow control valve (not shown) in the hydraulic circuit in which the accumulator section 668 and the hydraulic assemblies 116 are disposed. The same is true when the portions 22 move themselves to the load carrying position once the load is discharged.

Moreover, it will be understood that the travel of the portions 22 to the discharging position, for example, may be terminated before the extreme limit thereof is reached, as by means of the aforesaid flow control valve (not shown). Accordingly, the area of a discharge opening defined by and between the portions or hull halves 22 may be varied as desired, as when it is desired to line such as a harbor bottom, or otherwise discharge the load over a substantial area.

Certain directional terminology has been used in the above description, such as "length," "width," and the like. This terminology has been used only to facilitate an understanding of the present invention. Accordingly, it is intended in its normal and accepted sense, and is not in any way to be considered as limiting.

While the invention has been shown, illustrated, described and disclosed in terms of certain embodiments or modifications which it has assumed in practice, the scope of the invention should not be deemed to be limited by the precise embodiments or modifications herein shown, illustrated, described and disclosed.

What is claimed is:

1. A vehicle comprising:
   a plurality of load carrying portions defining a load carrying area and having edges;
   hinge means pivotally interconnecting the portions for movement from a load carrying position in which the edges abut the adjacent portion to a load discharging position in which the edges are spaced apart to discharge material therebetween; and
   apparatus for forcing the portions together to preload the edges throughout substantially the entire length of the load carrying area for precluding material loss therebetween, the appaartus comprising
      stop means for holding parts of the portions remote from the load carrying area apart; and
      means between the stop means and the portion edges for biasing the portions toward each other.

2. The vehicle of claim 1 wherein the stop means are located below the axis of the hinge means.

3. The vehicle of claim 1 wherein the edges are configured to abut intermediate the ends thereof prior to abutting at the ends thereof.

4. The vehicle of claim 3 wherein the edges are of generally parabolic contour.

5. The vehicle of claim 3 wherein the edges are nonlinear.

6. The vehicle of claim 3 wherein the edges are curvilinear.

7. The vehicle of claim 3 wherein the edges are cambered.

8. The vehicle of claim 1 wherein at least one of the edges is configured to abut the other of the load carrying portions intermediate the ends thereof prior to abutting at the ends thereof.

9. The vehicle of claim 1 wherein one stop means is disposed at one end of the vehicle and another stop means is disposed at the opposite end thereof.

10. Apparatus comprising
    a plurality of load carrying portions;
    means mounting the portions for relative movement between a load carrying position in which the portions define at least part of a load carrying receptacle to a load discharging position in which the portions are spaced apart to discharge material therebetween;
    at least one of the load carrying portions having an edge arranged to abut the adjacent portion when the portions are in the load carrying positions; and
    means for forcing the portions together to preload the abutting edge throughout substantially the entire length of the load carrying receptacle for precluding material loss from between the portion; the forcing means comprising
       stop means for holding selected parts of the portions apart; and
       means disposed between the stop means and the portion edges for urging the portions together.

11. A hydraulically operable vehicle of the type comprising load carrying portions defining a load carrying area and having edges; hinge means interconnecting the portions for movement from a load carrying position in which the edges abut the adjacent portion to a load discharging position in which the edges are spaced apart; and apparatus for forcing the portions together to preload the edges throughout substantially the entire length of the load carrying area for precluding material loss therebetween, the apparatus comprising
    stop means for holding selected parts of the portions apart;
    a hydraulic assembly disposed between the stop means and the portion edges and operatively associated with the portions for effecting movement of the portions between the positions and for retaining the portions in such positions;
    the hydraulic assembly comprising a piston-and-cylinder combination having an opening port and a closing port associated with the cylinder at opposite ends thereof;
    pump means for placing fluid under pressure in communication with the cylinder;
    a hydraulic control valve in fluid communication with the pump means and the cylinder for selectively directing the pressurized fluid to either one of the opening or closing ports of the cylinder to enable the assembly to move the portions between the plurality of positions; and
    check valve comprising a pilot operated check valve associated with the cylinder for retaining hydraulic fluid within the cylinder when pressurized fluid is not being admitted thereto for enabling the hydraulic assembly to retain the portions at any one of the plurality of positions.

12. A hydraulically operable vehicle of the type having load carrying portions defining a load carrying area and having edges; hinge means interconnecting the portions for movement from a load carrying position in which the edges abut the adjacent portion to a load discharging position in which the edges are spaced apart; and apparatus for forcing the portions together to preload the edges throughout substantially the entire length of the load carrying area for precluding material loss therebetween, the apparatus comprising
    stop means for holding selected parts of the portions apart;
    a pump for supplying a flow of pressurized hydraulic fluid;
    a hydraulic control valve having an inlet and a pair of outlets, the valve inlet being selectively connectable to each of the outlets;
    conduit means between the pump and the hydraulic control valve to direct the flow of pressurized hydraulic fluid from the pump to the inlet of the hydraulic control valve;
    a piston-and-cylinder combination disposed between the stop means and the portion edges and operatively associated therewith;
       the piston-and-cylinder combination having an opening port and a closing port to enable the alternate introduction of the flow of pressurized hydraulic fluid to each one of a plurality of sides of the piston thereof;
    a pair of conduits between the hydraulic control valve and the piston-and-cylinder combination;
    one of the conduits being connected between one of the pair of outlets of the hydraulic control valve and the opening port;
    the other of the conduits being connected between the other of the pair of outlets and the closing port to enable the hydraulic control valve to selectively direct the flow of pressurized hydraulic fluid to one of the opening port and the closing port; and
    check valving operatively associated with the piston-and-cylinder combination to prevent relative movement between the piston and the cylinder of the piston-and-cylinder combination in the absence of a flow of pressurized fluid thereto.

13. The vehicle of claim 12 wherein the check valve comprises
    a pilot operated check valve having an inlet port, and outlet port and pilot port;
    the inlet port and the pilot port being in fluid communication with the one of the pair of conduits, and the outlet port being in fluid communication with the closing port.

14. The vehicle of claim 13 wherein the check valving further comprises
    a check valve in the other of the pair of conduits.

15. The vehicle of claim 14 further comprising
    a variable restrictor valve in one of the conduits between the check valves and the piston-and-cylinder combination to control the rate of flow of the pressurized hydraulic fluid to enable the rate of movement of the portions to be controlled.

16. The vehicle of claim 12 wherein
the stop means are located below the axis of the hinge means.

17. A vehicle comprising:
a plurality of load carrying portions defining a load carrying area and having edges;
hinge means pivotally interconnecting the portions for movement from a load carrying position in which the edges abut the adjacent portion to a load discharging position in which the edges are spaced apart to discharge material therebetween; and
apparatus for forcing the portions together to preload the edges throughout substantially the entire length of the load carrying area for precluding material loss therebetween, the apparatus comprising
    stop means for holding selected parts of the portions apart; and
    fluid means for enabling the load carrying portions to be moved between the load carrying position and the load discharging position, the fluid means comprising:
        extensible fluid motor structure interconnecting the portions and disposed between the stop means and the portion edges, the motor having a first connection for receiving fluid to extend the motor and a second connection for receiving fluid to retract the motor;
        a source of pressurized fluid;
        conduit means placing the fluid source in communication with both ends of the fluid motor;
        first valve means in the conduit means for selectively extending or retracting the fluid motor;
        the conduit means comprising first passageway means leading from the first valve means to the first connection of the fluid motor;
        second passageway means leading from the first valve means to the second connection of the fluid motor;
        a first check valve in the first passageway means for allowing fluid flow toward the fluid motor and precluding reverse flow therefrom;
        a second check valve means interconnecting the second passageway and the first passageway between the first check valve and the first connection of the fluid motor, the second check valve means normally allowing fluid flow from the second passageway to the first passageway and precluding reverse flow; and
        means operable upon the delivery of pressurized fluid through the second passageway for opening the second check valve means to allow fluid flow from the first passageway to the second passageway.

18. The vehicle of claim 17 further comprising
restriction means in the first passageway means between the first connection and the second check valve means; and
check valve means in the first passageway means in parallel with the restriction means for allowing fluid flow toward the first connection and preventing reverse flow therefrom.

19. The vehicle of claim 17 wherein the last mentioned means comprises
pressure actuated pilot structure connected between the second passageway means and the second check valve means.

20. The vehicle of claim 17 wherein the last mentioned means comprises
a body having a chamber therein communicating with the second passageway;
a piston in the chamber;
a stem connecting the piston to the second check valve means; and
means biasing the stem against fluid from the second passageway means for closing the second check valve means.

21. The vehicle of claim 17 wherein the stop means are located below the axes of the hinge means.

22. The vehicle of claim 1 wherein the hinge means comprise a hinge adjacent opposite ends of the load carrying portions, the stop means comprise a stop means associated with each hinge.

23. The vehicle of claim 22 wherein the distance between the stop means is greater than the distance between the hinges.

References Cited
UNITED STATES PATENTS
3,404,650    10/1968    Miller et al.   ---------- 114—29

TRYGVE M. BLIX, Primary Examiner

UNITED STATES PATENT OFFICE
CERTIFICATE OF CORRECTION

Patent No. 3,509,841          Dated May 5, 1970

Inventor(s) Reink de Boer

It is certified that error appears in the above-identified patent and that said Letters Patent are hereby corrected as shown below:

Column 3, line 4, "with the respect" should be --with respect--.

Column 5, line 41, "respectively" should be --respectively.-

Column 7, line 21, "edge" should be --edges--.

Column 8, line 20, "relationhsip" should be --relationship--

Column 9, line 22, "to 129 to the" should be --129 to the--.

Column 10, line 54, "opeartion" should be --operation--.

Column 16, line 42, "ports" should be --port--.

Column 18, line 26, "thte" should be --the--.

Column 19, line 73, "therefore" should be --therefor--.

Column 20, line 4, "222" should be --22--.

Claim 1, line 13, "appaartus" should be --apparatus--.

Claim 10, line 47, "positions" should be --position--.

Claim 10, line 52, "portion" should be --portions--.

SIGNED AND SEALED
AUG 25 1970

(SEAL)
Attest:

Edward M. Fletcher, Jr.
Attesting Officer

WILLIAM E. SCHUYLER, JR.
Commissioner of Patents